United States Patent
Ben Shalom et al.

(10) Patent No.: US 9,368,245 B2
(45) Date of Patent: Jun. 14, 2016

(54) REMOTE MARKING

(71) Applicant: BLOOMFIELD SCIENCE MUSEUM JERUSALEM, Jerusalem (IL)

(72) Inventors: Amir Ben Shalom, Modiin (IL); Jacob Rosenberg, Jerusalem (IL)

(73) Assignee: Bloomfield Science Museum Jerusalem, Jerusalem (IL)

( * ) Notice: Subject to any disclaimer, the term of this patent is extended or adjusted under 35 U.S.C. 154(b) by 254 days.

(21) Appl. No.: 14/096,042

(22) Filed: Dec. 4, 2013

(65) Prior Publication Data
US 2014/0090482 A1  Apr. 3, 2014

Related U.S. Application Data

(63) Continuation of application No. 13/473,640, filed on May 17, 2012, now Pat. No. 8,617,436.

(60) Provisional application No. 61/487,307, filed on May 18, 2011.

(51) Int. Cl.
| | | |
|---|---|---|
| *G02B 5/02* | (2006.01) | |
| *G02B 5/23* | (2006.01) | |
| *G21K 5/00* | (2006.01) | |
| *B41M 5/28* | (2006.01) | |
| *B41M 5/34* | (2006.01) | |
| *C09D 11/50* | (2014.01) | |
| *G01F 1/704* | (2006.01) | |

(52) U.S. Cl.
CPC ............... *G21K 5/00* (2013.01); *B41M 5/284* (2013.01); *B41M 5/34* (2013.01); *C09D 11/50* (2013.01); *G01F 1/704* (2013.01)

(58) Field of Classification Search
CPC .......... G21K 5/00; B41M 5/284; B41M 5/34; G01F 1/704; C09D 11/50
USPC ..................... 525/586, 582; 106/47
See application file for complete search history.

(56) References Cited

U.S. PATENT DOCUMENTS

2008/0272316 A1* 11/2008 Ben Shalom ............ G01S 1/70
                                                         250/492.1
2010/0090858 A1* 4/2010 Nielsen ................ B65D 83/203
                                                         340/815.4

* cited by examiner

*Primary Examiner* — Ling Choi
*Assistant Examiner* — Jessica E Whiteley
(74) *Attorney, Agent, or Firm* — Yagod Morris & Associates Ltd.

(57) ABSTRACT

Remote marker systems are disclosed for marking a target using optical markers. Such systems may allow a target to be marked using a remote optical marking device. Also disclosed are photochromic solutions and methods of their preparation.

14 Claims, 15 Drawing Sheets

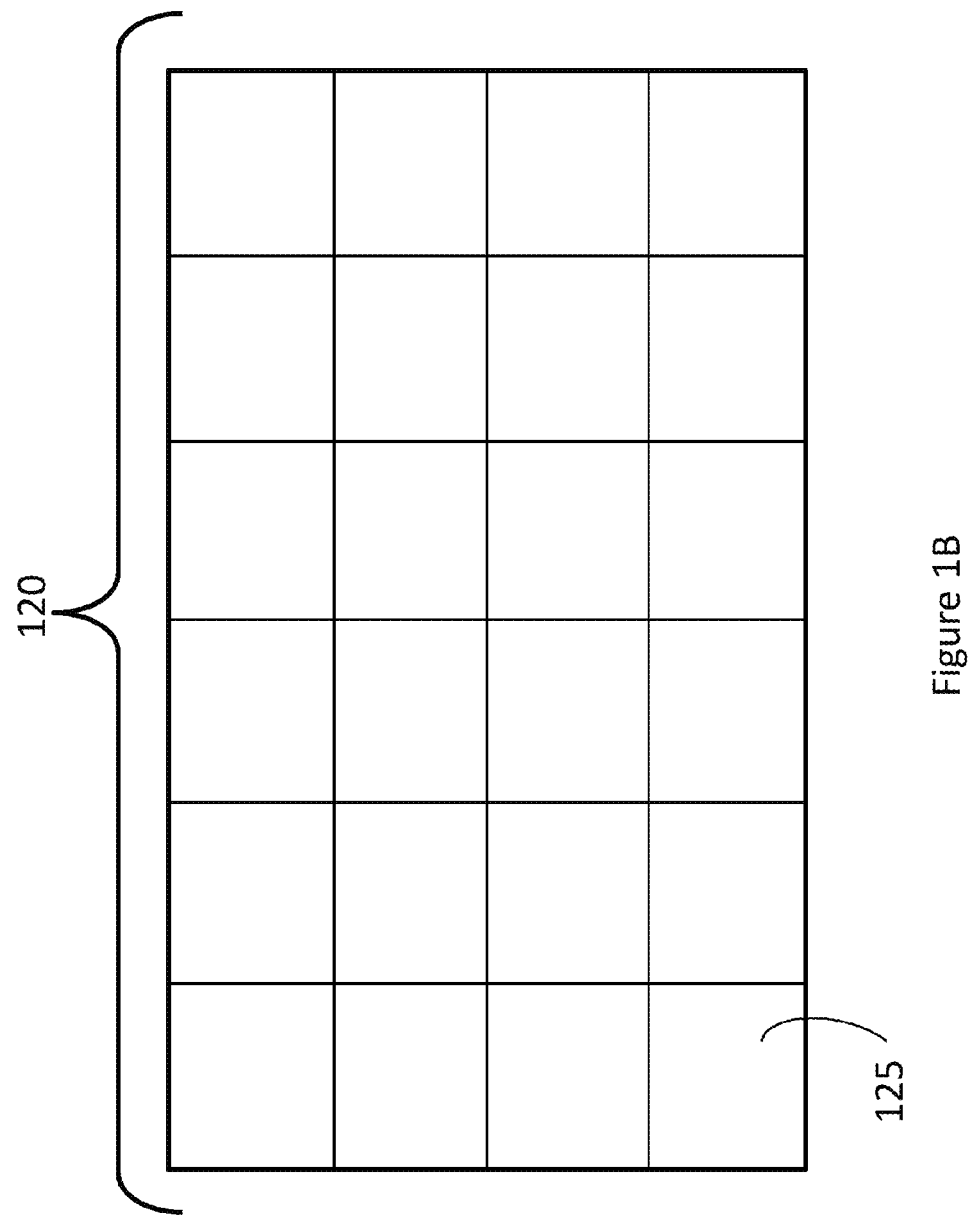

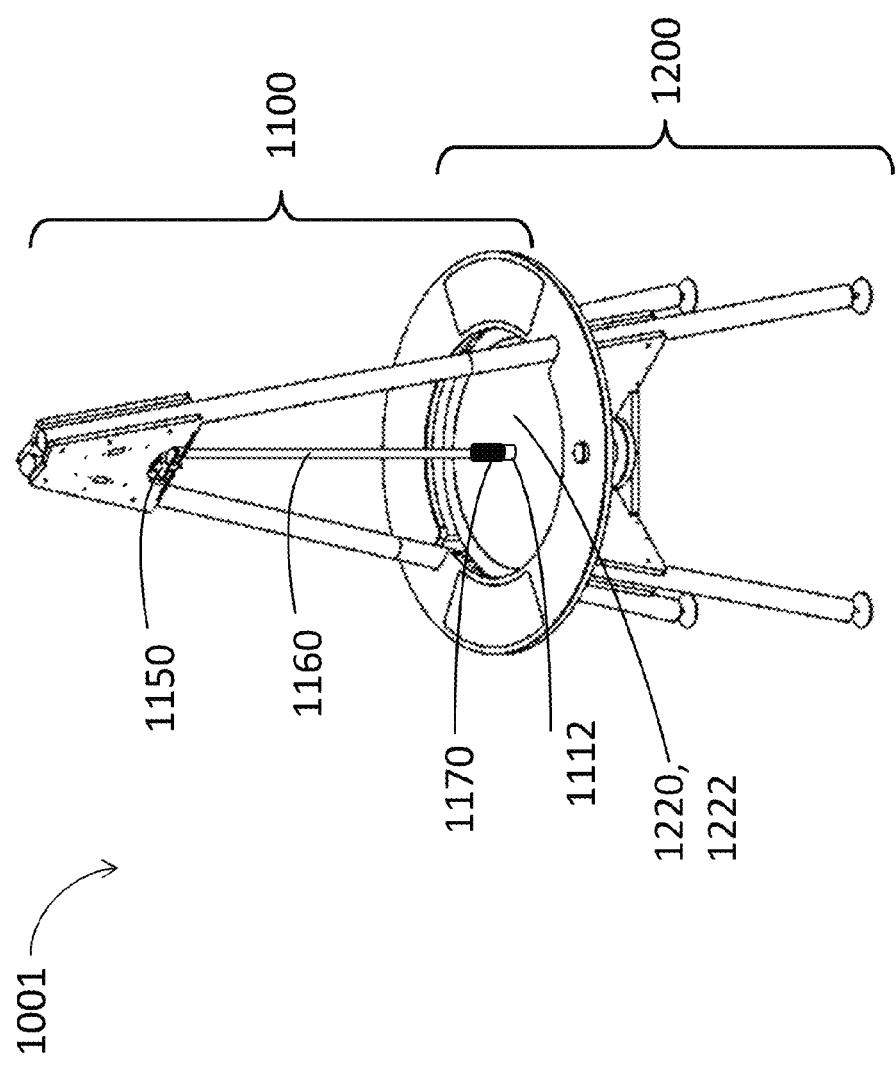

REMOTE MARKING

CROSS-REFERENCE TO RELATED APPLICATIONS

This application is a continuation of U.S. patent application Ser. No. 13/473,640, filed May 17, 2012, which claims the benefit of priority from U.S. Provisional Patent Application No. 61/487,307, filed May 18, 2011, the contents of which are incorporated herein by reference in its entirety.

FIELD OF THE INVENTION

Systems are disclosed for marking a target using optical markers. Such systems may allow a target to be marked using a remote optical marking device.

It is noted that an optical marking system may have a variety of applications as described below.

Also disclosed is a photochromic solution and methods of its preparation.

SUMMARY OF THE INVENTION

In accordance with a first aspect of the present disclosure, there is provided a remote marking system comprising at least one marker unit and at least one target wherein said marker unit comprises at least one emitter configured to emit at least one tracer signal and said target comprises at least one receiving medium configured to change its state upon reception of said tracer signal. In certain embodiments of the disclosure, the remote marking system enables the recording of the position at which said tracer signal is received.

In certain embodiments of the disclosure, the emitter is configured to emit electromagnetic radiation. Optionally, the emitter emits radiation selected from the group comprising of: visible light, infrared, ultraviolet and radio waves.

In certain embodiments of the disclosure, the remote marker system further comprises a concentrator configured to increase the intensity of the tracer signal. Optionally, the concentrator comprises a beam focusing device such as a converging lens, a concave reflector, an array of angled reflectors and the like.

In certain embodiments of the disclosure, the receiving medium comprises a photosensitive material. Optionally, the photosensitive material is selected from the group comprising: photochromic materials, photoluminescent materials, phosphorescent materials, thermochromic materials and polarising materials. Optionally, the photosensitive material comprises a matrix of photosensitive electronic components selected from the group comprising: photodiodes, photovoltaic cells, photodetectors, photomultipliers and photoconductors.

In certain embodiments of the disclosure, the target comprises at least one target region comprising a receiving medium configured to change its appearance in a detectable manner upon reception of said tracer signal. Optionally, the target comprises a plurality of target regions, wherein a first target region comprises a first receiving medium selected such that upon reception of said tracer signal, said first receiving medium changes its appearance in a first detectable manner that is distinct from a second receiving medium of at least one other target region. Optionally, the target comprises at least one receiving medium selected such that upon reception of said tracer signal, the color of the receiving medium changes to a color selected from a group consisting of red, blue, green, black, grey, cyan, magenta, yellow, white and combinations thereof.

In certain embodiments of the disclosure, the target comprises a plurality of target regions, each of said target region comprising: (1) a first receiving medium selected such that upon reception of said tracer signal, the color of at least a section of said target region turns red; (2) a second receiving medium selected such that upon reception of said tracer signal, the color of at least a section of said target region turns green; (3) a third receiving medium selected such that upon reception of said tracer signal, the color of at least a section of said target region turns blue; and (4) a fourth receiving medium selected such that upon reception of said tracer signal, the color of at least a section of said target region turns black.

In other embodiments of the disclosure, the target comprises a plurality of target regions, each of said target region comprising: (1) a first receiving medium selected such that upon reception of said tracer signal, the color of at least a section of said target region turns cyan; (2) a second receiving medium selected such that upon reception of said tracer signal, the color of at least a section of said target region turns magenta; (3) a third receiving medium selected such that upon reception of said tracer signal, the color of at least a section of said target region turns yellow; and (4) a fourth receiving medium selected such that upon reception of said tracer signal, the color of at least a section of said target region turns black.

In certain embodiments of the disclosure, the above remote marker system is incorporated into a device for providing a demonstration in a science center.

In certain embodiments of the disclosure, the above remote marker system is incorporated into a device for providing a demonstration in a science center, a visual display unit, a harmonograph, a toy, a flow monitor or a writing apparatus.

In a second aspect of the disclosure, there is provided a target for use in the remote marker system of the first aspect of the disclosure. In certain embodiments of the disclosure, the target is provided to indicate the locations of stray shots fired from the remote markers of the remote marker system and aimed towards an objective.

In a third aspect of the disclosure, there is provided a method for tracing the trajectory of a remote marker comprising the steps of: (1) providing the remote marking system of the first aspect of the disclosure, comprising at least one marker unit and at least one target comprising a receiving medium configured to change its state upon reception of said tracer signal; and (2) emitting a tracer signal from the marker unit such that the target region records the position at which said tracer signal is received.

In a fourth aspect of the disclosure, there is provided a remote marking system comprising at least one marker unit, at least one target and at least one concentrator wherein said marker unit comprises at least one emitter configured to emit at least one low intensity tracer signal; said target region comprises at least one receiving medium configured to change its state upon reception of a high intensity tracer signal thereby recording the position at which said high intensity tracer signal is received; and said concentrator is configured to transform a low intensity tracer signal to a high intensity tracer signal.

In certain embodiments of the disclosure, the emitter is configured to emit electromagnetic radiation. Optionally, the emitter emits radiation selected from the group comprising: visible light, infrared, ultraviolet and radio waves.

In certain embodiments of the disclosure, the receiving medium comprises a photosensitive material. Optionally, the photosensitive material is selected from the group comprising: photochromic materials, photoluminescent materials, phosphorescent materials, thermochromic materials and polarising materials. Optionally, the photosensitive material comprises a matrix of photosensitive electronic components selected from the group comprising: photodiodes, photovoltaic cells, photodetectors, photomultipliers and photoconductors.

In certain embodiments, of the disclosure, the concentrator comprises a beam focusing device such as a converging lens, a concave reflector, an array of angled reflectors and the like.

In certain embodiments of the disclosure, the marker unit comprises an extended emitter operable to emit a low intensity tracer signal over an extended region and said concentrator is configured to focus said low intensity signal such that it is incident upon a concentrated region of said receiving medium. Optionally, the extended emitter comprises a high intensity emitter and a beam disperser such as a diverging lens, convex reflector, an array of angled reflectors and the like. Optionally, the extended emitter comprises an array of low intensity emitters, and the concentrator comprises said array of low intensity emitters being angled towards a concentrated region of said receiving medium. Optionally, the low intensity tracer signal has an intensity below a first threshold. Optionally, the first threshold is selected to be safe. Optionally, the high intensity tracer signal has an intensity above a second threshold that is higher than the first threshold. Optionally, the second threshold is selected to be such that the high intensity tracer signal is of an intensity sufficient to change the state of the receiving medium.

In a fourth aspect of the disclosure, there is provided a remote marking system comprising at least one marker unit and at least one extended target wherein said marker unit comprises at least one emitter configured to emit at least one tracer signal; and said extended target comprises at least one receiving medium configured to change its state upon reception of a high intensity tracer signal thereby recording the position at which said high intensity tracer signal is received.

In certain embodiments of the disclosure, the emitter is configured to emit a low intensity tracer signal, and the remote marking system further comprises a concentrator configured to focus the low intensity tracer signal upon at least a section of said target region with a high intensity.

In certain embodiments of the disclosure, the extended target comprises at least a first receiving medium selected such that upon reception of the tracer signal, at least a section of the extended target changes its appearance in a detectable manner. Optionally, the extended target further comprises at least a second receiving medium selected such that upon reception of said tracer signal, at least a section of said extended target changes its appearance in a second detectable manner different from that of the first receiving medium.

In certain embodiments of the disclosure, the extended target comprises at least one receiving medium selected such that upon reception of the tracer signal, the color of at least a section of the extended target changes to a color selected from a group consisting of red, blue, green, black, grey, cyan, magenta, yellow, white and combinations thereof.

In certain embodiments of the disclosure, the extended target comprises: (1) a first receiving medium selected such that upon reception of said tracer signal, the color of at least a section of said target turns red; (2) a second receiving medium selected such that upon reception of said tracer signal, the color of at least a section of said extended target turns green; (3) a third receiving medium selected such that upon reception of said tracer signal, the color of at least a section of said extended target region turns blue; and (4) a fourth receiving medium selected such that upon reception of said tracer signal, the color of at least a section of said extended target turns black.

In certain embodiments of the disclosure, the extended target is divided into an array of pixels.

In certain embodiments of the disclosure, the extended target is extended into three dimensions.

In certain embodiments of the disclosure, the extended target is divided into an array of voxels.

In certain embodiments of the disclosure, the receiving medium is translucent.

In certain embodiments of the disclosure, the extended target is configured to record an image traced by said emitter.

In certain embodiments of the disclosure, the extended target is configured to record a three dimensional image.

In certain embodiments of the disclosure, the emitter is configured to emit electromagnetic radiation. Optionally, the emitter emits radiation selected from the group comprising: visible light, infrared, ultraviolet and radio waves.

In certain embodiments of the disclosure, the receiving medium comprises a photosensitive material. Optionally, the photosensitive material is selected from the group comprising: photochromic materials, photoluminescent materials, phosphorescent materials, thermochromic materials and polarising materials. Optionally, the photosensitive material comprises a matrix of photosensitive electronic components selected from the group comprising: photodiodes, photovoltaic cells, photodetectors, photomultipliers and photoconductors.

In a fifth aspect of the disclosure, there is provided a three dimensional visual display unit (VDU) comprising the remote marker system of the fourth aspect of the disclosure.

In a sixth aspect of the disclosure, there is provided a method of producing three dimensional images comprising: (1) obtaining the remote marker system of the fourth aspect of the disclosure comprising at least one emitter configured to emit at least one tracer signal and a target extended into three dimensions comprising at least one receiving medium configured to change its state upon reception of a tracer signal; and (2) emitting a least one tracer signal from the emitter such that they are incident upon sections of said target, said sections of said target being selected such that the state of the receiving medium within said sections is detectably altered.

In a seventh aspect of the disclosure, there is provided a flow monitor comprising at least one marker unit comprising at least one emitter configured to emit at least one tracer signal towards a tracer fluid, said tracer fluid comprising at least one receiving medium configured to change its state upon reception of a high intensity tracer signal thereby recording the position at which said high intensity tracer signal is received.

In certain embodiments of the disclosure, the flow monitor further comprises at least one detector operable to detect said changed state in the receiving medium of said tracer fluid.

In certain embodiments of the disclosure, the tracer fluid comprises a flowing liquid or gas.

In certain embodiments of the disclosure, the emitter is configured to emit electromagnetic radiation. Optionally, the emitter emits radiation selected from the group comprising: visible light, infrared, ultraviolet and radio waves.

In certain embodiments of the disclosure, the receiving medium comprises a photosensitive material. Optionally, the photosensitive material is selected from the group comprising: photochromic materials, photoluminescent materials, phosphorescent materials, thermochromic materials and polarising materials. Optionally, the photosensitive material comprises a matrix of photosensitive electronic components selected from the group comprising: photodiodes, photovoltaic cells, photodetectors, photomultipliers and photoconductors.

In an eighth aspect of the disclosure, there is provided a method for monitoring fluid flow comprising: (1) providing the flow monitor of the seventh aspect of the disclosure comprising at least one marker unit comprising at least one emitter configured to emit at least one tracer signal to at least one tracer fluid; (2) providing at least one tracer fluid comprising a receiving medium; (3) emitting a tracer signal from the emitter towards said tracer fluid; (4) detecting changes in said tracer fluid indicating material exposed to said tracer signal; and (5) tracking the progress of the exposed material along said fluid flow.

In a ninth aspect of the disclosure, there is provided a virtual writing system comprising: a stylus and a touch pad configured to record the track of said stylus wherein said touch pad comprises: (1) at least one primary inductor connected to a power source via a driver, said driver operable to supply an oscillating potential across said primary inductor, and (2) at least one receiving medium configured to change its optical state upon reception of a tracer signal; and wherein said stylus comprises: (1) at least one secondary inductor configured to inductively couple with said primary inductor, and (2) an emitter wired to said secondary inductor and configured to emit a tracing signal when said secondary inductor is coupled to said primary inductor; such that a visible trace indicating the path of the stylus is left on the touch pad.

In certain embodiments of the disclosure, the emitter is configured to emit an electromagnetic radiation. Optionally, the electromagnetic radiation is selected from the group comprising: visible light, infrared, ultraviolet and radio waves.

In certain embodiments of the disclosure, the receiving medium comprises a photosensitive material. Optionally, the photosensitive material is selected from the group comprising: photochromic materials, photoluminescent materials, phosphorescent materials, thermochromic materials and polarising materials. Optionally, the photosensitive material comprises a matrix of photosensitive electronic components selected from the group comprising: photodiodes, photovoltaic cells, photodetectors, photomultipliers and photoconductors.

In a tenth aspect of the disclosure, there is provided a harmonograph comprising a pendulum and base, the pendulum comprising a pivoting apparatus, a bob and a connecting rod therebetween, the bob comprises an emitter configured to direct a tracer signal towards the base, and the base comprising a receiving medium such that it changes its appearance detectable upon reception of the tracer signal.

In certain embodiments of the disclosure, the emitter is configured to emit an electromagnetic radiation. Optionally, the electromagnetic radiation is selected from the group comprising: visible light, infrared, ultraviolet and radio waves.

In certain embodiments of the disclosure, the receiving medium comprises a photosensitive material. Optionally, the photosensitive material is selected from the group comprising: photochromic materials, photoluminescent materials, phosphorescent materials, thermochromic materials and polarising materials. Optionally, the photosensitive material comprises a matrix of photosensitive electronic components selected from the group comprising: photodiodes, photovoltaic cells, photodetectors, photomultipliers and photoconductors.

In certain embodiments, the base unit comprises a primary inductor connected to a power source via a driver and the bob comprises a secondary inductor connected to the emitter via a regulator, such that the proximity of the bob to the base unit activates the emitter.

In certain embodiments, the emitter is connected to a power source via a switch, such that a user controls when the tracer signal is emitted.

In an eleventh aspect of the disclosure, there is provided a photochromic solution comprising a photochromic material and a solvent.

In certain embodiments, the photochromic material is a photochromic dye comprising a spiro-oxazine compound, a naphthopyran compound, spiropyrans compound, a triarylmethane compound, a stilbene compound, an azastilbene compound, a nitrone compound, a fulgide compound, a diarylethylene compound or a quinine compound.

In certain embodiments, the solvent is an organic solvent. Optionally, the organic solvent is selected from the group consisting of a hydrocarbon, an oil, a paraffin oil, mineral oil, kerosene, a polar aprotic solvent, an ether, a polar protic solvent, benzene, toluene, xylene, hexane, chloroform, methylene chloride, carbon disulfide, dimethyl sulfoxide, acetone, methyl ethyl ketone, ethyl acetate, acetonitrile, tetrahydrofuran, dioxane, methanol, ethanol, methyl cellosolve, ethyl cellosolve, and any mixture thereof. In a particular embodiment the solvent is toluene. In another particular embodiment, the solvent is a paraffin oil. In another particular embodiment, the solvent is a combination of a paraffin oil and toluene.

In certain embodiments, the photochromic solution may further comprise an antioxidant.

In certain embodiments, the photochromic solution may further comprise an ultraviolet radiation protectant (UV protectant).

In a twelfth aspect of the disclosure, there is provided a method of preparing a photochromic solution, the method comprising the steps of: (1) providing a starter solution comprising a photochromic material and a first solvent and (2) mixing the starting solution to a second solvent.

In certain embodiments, the first solvent is toluene.

In certain embodiments, the second solvent is a paraffin oil.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

FIG. 1B shows a target comprising a matrix of photosensitive electronic components.

FIG. 7A shows a harmonograph.

DETAILED DESCRIPTION OF THE INVENTION

Receiving Medium

Figure 1A:
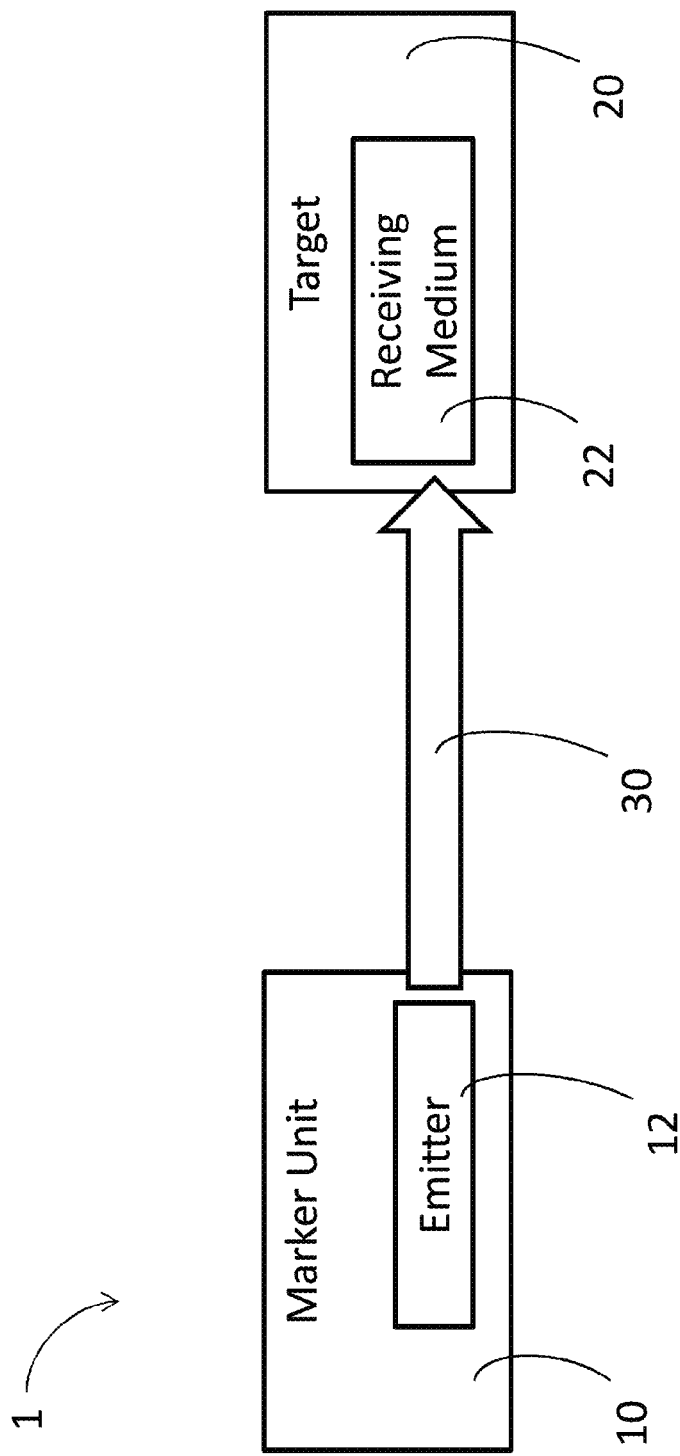
FIG. 1A shows a remote marking system comprising a marker unit and a target.

The receiving medium may be, or comprise, a photosensitive material such as photochromic materials, photoluminescent materials, phosphorescent materials, thermochromic materials, polarising materials or the like. The material used for the receiving medium is typically selected such that a detectable trace mark is left when the receiving medium is exposed to a tracer signal.

The photosensitive material may have a characteristic half-life that determines the time taken for the trace mark to fade. The receiving medium may be selected with a half-life suitable to allow the tracing apparatus to self-erase over a desired time period for repeated use.

The receiving medium may be a liquid at room temperature. The liquid may be viscous or non-viscous. In certain embodiments, the receiving may be a solid at room temperature. In certain embodiments, the receiving medium may be added to other materials such as paint. In certain embodiments, the receiving medium may be incorporated into other materials, such as paper, plastic, epoxy or polymer. The receiving medium may be in a solid form, crushed into a powder, and added to a liquid, such that a suspension if formed. The receiving medium may be in a liquid form, added to a second liquid that is not miscible with the receiving medium and mixed such that a colloid is formed.

The photosensitive material may comprise a matrix of photosensitive electronic components selected from the group comprising: photodiodes, photovoltaic cells, photodetectors, photomultipliers and photoconductors.

Photochromic Solution

In certain embodiments, the receiving medium may be a photochromic solution comprising a photochromic material and a solvent Various photochromic materials and solvents are known in the art.

The photochromic material may be, or comprise, a photochromic dye comprising a spiro-oxazine (alternatively spiroxazine) compound, a naphthopyran compound, spiropyrans compound, a triarylmethane compound, a stilbene compound, an azastilbene compound, a nitrone compound, a fulgide compound, a diarylethylene compound, a quinine compound or any combination thereof. Particular examples of a photochromic dye include NCC® photochromic dyes (OP12—purple, OP13—sky blue, OP14—blue, OP16—yellow, OP17—orange, OP19—magenta and OP22—grey) from New Prismatic Enterprise Co., Ltd., Taiwan). Other examples of a photochromic dye include the Reversacol™ photochromic dyes from Vivimed Labs Europe Ltd. Other examples of a photochromic dye include LCR Hallcrest™ photochromic dyes (BL1—blue, R19—magenta, O17—orange, P1—purple, R1—red, Y1—yellow) from Hallcrest, Glenview, Ill. Other examples of a photochromic dye include Sands Effect® photochromic dyes (MSA6553—yellow, MSA6554—orange, MSA6556—red, MSA6557—blue, MSA6558—royal blue, MSA6559—violet) from H.W. Sands Corp., Jupiter, Fla.

The solvent may be an organic solvent. The organic solvent may be selected from the group consisting of a hydrocarbon, an oil, a paraffin oil, a polar aprotic solvent, an ether, a polar protic solvent, kerosene, mineral oil, benzene, toluene, xylene, hexane, chloroform, methylene chloride, carbon disulfide, dimethyl sulfoxide, acetone, methyl ethyl ketone, ethyl acetate, acetonitrile, tetrahydrofuran, dioxane, methanol, ethanol, methyl cellosolve, ethyl cellosolve, and any mixture thereof.

In a particular embodiment, the solvent is toluene.

In another particular embodiment, the solvent is a paraffin oil.

In another particular embodiment, the solvent is a combination of a paraffin oil and toluene.

The term "paraffin oil" is used herein to denote an oil typically comprising hydrocarbons, for example, alkenes with the general formula $C_nH_{2n+2}$ (if in linear form) that is typically in a liquid state at room temperature. Paraffin oil may also be referred to as liquid paraffin. These terms may include mineral oil, nujol, adepsine oil, alboline, glymol, medicinal paraffin, or saxol.

The receiving medium may further comprise an antioxidant. There are many antioxidants known in the art. In certain embodiments, the receiving medium may further comprise an ultraviolet radiation protectant (UV protectant). There are many UV protectants known in the art.

In certain embodiments of the disclosure, the receiving medium comprises a photochromic dye dissolved in a paraffin oil base. The photochromic dye may be dissolved in the paraffin oil base at a concentration (w/w) of about 0.001%, about 0.005%, about 0.01%, about 0.05%, about 0.1%, about 0.05%, about 0.75%, about 0.15%, about 0.2%, about 0.3%, about 0.4%, about 0.5%, between 0.01 and 1%, between 0.02 and 0.5%, or between 0.05 and 0.2%. The receiving medium may further comprise toluene at a concentration (w/w) of about 0.01%, about 0.1%, about 0.5%, about 1%, about 2%, about 3%, about 4%, about 5%, about 6%, about 7%, about 8%, about 9%, about 10%, between 1 and 10%, between 1 and 4%, between 1 and 5%, between 2 and 4%, or between 2 and 6%.

In a particular embodiment of the disclosure, the receiving medium comprises the purple NCC® photochromic dye OP12 ("OP12") dissolved in a toluene base. OP12 may be dissolved in the toluene base at a concentration (w/w) of about 1%, about 2%, about 3%, about 4%, about 5%, about 6%, about 7%, about 8%, about 10%, about 15%, between 1 and 10%, between 2 and 5%, or between 2 and 10%. The receiving medium comprising the photochromic material OP12 and the toluene base is described in further detail in the Examples below.

In a particular embodiment of the disclosure, the receiving medium comprises OP12 dissolved in a paraffin oil base. OP12 may be dissolved in the paraffin oil base at a concentration (w/w) of about 0.001%, about 0.01%, 0.05%, about 0.075%, about 0.1%, about 0.12%, about 0.14%, about 0.15%, about 0.16%, about 0.18%, about 0.2%, about 0.3%, about 0.4%, about 0.5%, between 0.01 and 1%, between 0.02 and 0.5%, and between 0.05 and 0.2%. In certain embodiments, the receiving further comprises toluene at a concentration (w/w) of about 0.01%, about 0.1%, about 0.5%, about 1%, about 2%, about 3%, about 4%, about 5%, about 6%, about 7%, about 8%, about 9%, about 10%, between 1 and 10%, between 1 and 4%, between 1 and 5%, between 2 and 4%, or between 2 and 6%. The receiving medium comprising the photochromic material OP12 and the paraffin oil base is described in further detail in the Examples below.

In a particular embodiment of the disclosure, the receiving medium comprises the blue NCC® photochromic dye OP14 ("OP14") dissolved in a toluene base. OP14 may be dissolved in the toluene base at a concentration (w/w) of about 0.1%, about 0.2%, about 0.3%, about 0.4%, about 0.5%, about 0.6%, about 0.7%, about 0.8%, about 0.85%, about 0.9%, about 0.95%, about 1%, about 1.1%, about 1.2%, between 0.01 and 1%, between 0.02 and 0.5%, between 0.75 and 1.25%, between 0.8 and 1%, between 0.8 and 1.2%, or between 0.05 and 0.2%. The receiving medium comprising the photochromic material OP14 and the toluene base is described in further detail in the Examples below.

In a particular embodiment of the disclosure, the receiving medium comprises OP14 dissolved in a paraffin oil base. OP14 may be dissolved in the paraffin oil base at a concentration (w/w) of about 0.001%, about 0.005%, 0.01%, about 0.02%, about 0.03%, about 0.04%, about 0.05%, about 0.06%, about 0.07%, about 0.08%, about 0.085%, about 0.09%, about 0.095%, about 0.1%, about 0.11%, about 0.12%, between 0.01 and 0.1%, between 0.02 and 0.08%, between 0.07 and 0.12%, between 0.08 and 0.1%, between 0.08 and 0.12%, and between 0.05 and 0.2%. In certain embodiments, the receiving further comprises toluene at a concentration (w/w) of about 0.01%, about 0.1%, about 0.5%, about 1%, about 2%, about 3%, about 4%, about 5%, about 6%, about 7%, about 8%, about 9%, about 10%, between 1 and 10%, between 1 and 4%, between 1 and 5%, between 2 and 4%, or between 2 and 6%. The receiving medium comprising the photochromic material OP14 and the paraffin oil base is described in further detail in the Examples below.

In a particular embodiment of the disclosure, the receiving medium comprises the magenta NCC® photochromic dye OP19 ("OP19") dissolved in a toluene base. OP19 may be dissolved in the toluene base at a concentration (w/w) of about 0.1%, about 0.05%, about 0.75%, about 0.15%, about 0.2%, about 0.3%, about 0.4%, about 0.5%, between 0.01 and 1%, between 0.02 and 0.5%, or between 0.05 and 0.2%. The receiving medium comprising the photochromic material OP19 and the toluene base is described in further detail in the Examples below.

In a particular embodiment of the disclosure, the receiving medium comprises OP19 dissolved in a paraffin oil base. OP19 may be dissolved in the paraffin oil base at a concentration (w/w) of about 0.001%, about 0.005%, about 0.01%, about 0.05%, about 0.1%, about 0.05%, about 0.75%, about 0.15%, about 0.2%, about 0.3%, about 0.4%, about 0.5%, between 0.01 and 1%, between 0.02 and 0.5%, or between 0.05 and 0.2%. In certain embodiments, the receiving medium comprising the paraffin oil base further comprises toluene at a concentration (w/w) of about 0.01%, about 0.1%, about 0.5%, about 1%, about 2%, about 3%, about 4%, about 5%, about 6%, about 7%, about 8%, about 9%, about 10%, between 1 and 10%, between 1 and 4%, between 1 and 5%, between 2 and 4%, and between 2 and 6%. The receiving medium comprising the photochromic material OP19 and the paraffin oil base is described in further detail in the Examples below.

Methods are taught for the preparation of a receiving medium comprising a photochromic material and a paraffin oil base. The method may comprise the steps: obtain a paraffin oil; prepare a solution of the photochromic material in a toluene base; mix the photochromic material/toluene solution and paraffin oil in amounts appropriate to achieve the desired final concentration of photochromic material; heat the mixture to remove the toluene via evaporation such that the remaining composition is the photochromic material dissolved in paraffin oil. In certain embodiments, the toluene is not fully removed. This method is described in further detail in the Examples below.

EXAMPLE 1

Preparation of 0.1% w/w OP19 Solution in Paraffin Oil

Test and results: 30 drops of fresh paraffin oil and 30 drops of a toluene-based OP19 solution (0.1% w/w OP19) were mixed in a metal bowl. Once the combination was mixed, the bowl was transferred to a hot plate to remove the toluene solvent via evaporation. The evaporation step was completed when the odour of toluene was no longer detectable. The liquid was transferred from the metal bowl to a glass test tube. A visual comparison of the volume of the photochromic material solution in the test tube with a second test tube filled with 30 drops of fresh paraffin oil showed that the two volumes were equal, confirming that the toluene completely evaporated from the solution. Hence, the concentration of the photochromic material in paraffin oil was approximately 0.1% w/w, the same as it was in the original toluene solvent base.

The paraffin oil-base photochromic material solution was illuminated through the side of the test tube by an ultraviolet (UV) or violet laser. Photochromic effect was observed, as it was in the toluene-based solution.

Conclusions: The results establish that there is a safe, non-flammable alternative to harmful or toxic organic solvents as a medium for the photochromic material that maintains its photochromic effect. It was previously thought that the photochromic material required to be dissolved in an organic solvent, because directly dissolving the photochromic material in a non-organic solvent medium was not possible, or no photochromic effect was observed (results not shown).

EXAMPLE 2

Preparation of 0.4% w/w OP19 Solution in Paraffin Oil

Preparation of OP19 solution in toluene: The preparation of a 2% w/w solution of OP19 in toluene was tested. 0.16±0.01 grams of OP19 powder and 7.0 grams of toluene were combined into a test tube to achieve a concentration of 2.2% w/w OP19 in toluene, i.e., 0.16 grams OP19/(7 grams toluene+0.16 grams OP19). The test tube was stirred while heating with a hot air blower to induce the OP19 to go into solution. After the OP19 went completely into solution, the tube was cooled to 19 degrees Centigrade. Even after cooling, the OP19 stayed in solution and no crystallization was observed. The solution was then further diluted by adding 1.2 grams of toluene to achieve a final concentration of 1.9% w/w.

Preparation of OP19 solution in light paraffin oil: In light of the availability of the 1.9% w/w OP19 toluene-based solution, the preparation of a paraffin oil-based solution at 0.4% w/w OP19, was attempted. A light paraffin oil base with a maximum viscosity of 33.5 centiStokes (cSt) and a density of 0.818-0.880 grams per cubic centimeter (g/cc) was used. 2.0 grams of the light paraffin oil and 0.42 grams of the 1.9% w/w toluene-based OP19 solution were mixed in a test tube. The toluene was partially removed through evaporation by heating the mixture with a hot air blower. A total of 0.2 grams of toluene was removed in this manner. After the partial removal of toluene, the concentration toluene was 9% w/w and the concentration of the OP19 was 0.36% w/w. No sedimentation of the photochromic material in the paraffin oil-based solution was observed. Exposure of the solution to a UV or violet laser produced a strong photochromic effect.

Crystallization of OP19 after storage: After five (5) days of storage at room temperature, both the toluene-based solution and the paraffin oil-based solution were tested for the presence of crystallized photochromic material. In a toluene-based solution of 1.95% w/w OP19, crystallization was observed. In the paraffin oil-based solution of 0.36% w/w OP19, no crystallization was observed. By contrast, in the paraffin oil-based OP19 solution (0.1% w/w OP19) of Example 1, some crystallization was observed.

CONCLUSION

1. The maximum concentration of OP19 in toluene at room temperature is close to 1.9% w/w.
2. The maximum concentration of OP19 in paraffin oil at room temperature is more than 0.36% w/w.

EXAMPLE 3

Preparation of Paraffin Oil-Based Solution of Photochromic Material OP14 (blue).

A toluene based solution of OP14 (0.96% w/w OP14) was prepared. A paraffin oil-based solution of OP14 was then prepared by mixing the toluene-based OP14 solution with paraffin oil. The mixture was then heated to remove the toluene through evaporation. When the paraffin oil-based solution with 0.1% w/w OP14 was prepared in this way, slight sedimentation was found. Another paraffin oil-based solution with 0.08% w/w OP14 was produced with the same method, but with a different paraffin oil base (Sahar S. Srebernik & Sons; no viscosity or specific gravity data). No sedimentation was observed after removal of toluene, and no crystallization was observed after storage for two (2) days at room temperature. Exposure of the solution to a UV or violet laser produced a strong photochromic effect.

CONCLUSIONS

1. The Sahar paraffin oil and the first paraffin oil are equally effective for preparing the receiving medium.
2. The maximum concentration of OP14 in paraffin oil is more than 0.08% w/w and less than 0.1% w/w.

EXAMPLE 4

Preparation of OP12 Solution in Toluene

A 2% w/w solution of photochromic material OP12 in toluene was attempted. 0.1±0.01 grams of OP12 powder was dissolved into 5.03±0.01 grams of toluene in a test tube. Most of the powder dissolved and a dark purple solution resulted, but a small amount remained out of solution and sank to the bottom of the test tube. Exposure of the solution to an ultra-violet (UV) or violet laser produced a strong photochromic effect. In order to solubilize the remaining sediment of OP12, an additional 1.70 grams of toluene was added, resulting in a final concentration of 1.5% OP12 w/w. A small amount of sediment remained, but gentle heating with a hot air blower resulted in full solubility. The presence of a strong photochromic effect was again confirmed by UV or violet laser. Conclusion: The maximum concentration of OP12 in toluene at room temperature is approximately 1.4% w/w.

EXAMPLE 5

Preparation of OP12 Solution in Paraffin Oil 4.5 grams of paraffin oil (Sahar) and 0.45 grams of toluene-based 1.5% w/w OP12 solution were combined in a test tube. No sedimentation of OP12 was observed in either the paraffin oil or the toluene. The toluene was then partially removed through heating to vaporize the toluene. The test tube containing the mixture was placed on a hot-plate and allowed to reach a temperature of 170 degrees Centigrade, which resulted in a significant amount of gas release (presumably vaporized toluene). In total, 0.26 grams of toluene was removed from the solution by vaporization, leaving 0.19 grams of toluene in the mixture (the original 0.45 grams of the toluene-based solution—the 0.26 of toluene removed via vaporization). In the resulting mixture, the concentration of the remaining toluene was 4% w/w, i.e., 0.19 grams toluene/ (0.19 grams toluene+4.5 grams paraffin oil), and the concentration of OP12 was 0.14% w/w, i.e., 0.45 grams of the original toluene solution×1.5%/(0.19 grams toluene+4.5 grams paraffin oil).

The OP12 remained completely in solution and no sedimentation was observed. After 2 days of storage at room temperature, both the paraffin oil solution (0.14% w/w OP12) and the toluene solution (1.5% w/w OP12) were free of crystals.

CONCLUSIONS

1. A solution of OP12 in paraffin oil can be prepared at a concentration of at least 0.14% w/w OP12.

EXAMPLE 6

The Addition of Antioxidant and UV Protectant Additives into Toluene-Based Photochromic Material Solutions 6.7 grams of the 1.5% w/w toluene based OP12 solution containing 0.10 grams OP12 (6.7 grams solution×1.5% w/w OP12 concentration=0.10 grams of OP12) was placed in a test tube and 0.058 grams of antioxidant AO-001 and 0.057 grams of UV protectant LS-UV-001 was added (In accordance with the manufacturer recommendation that the concentration of the antioxidant or UV protectant was half of that of the photochromic material in the solution). Both additives fully dissolved into the solution. The additives AO-001 and LS-UV-001 dissolved equally well in toluene-based solutions of other photochromic materials, e.g., 2% w/w OP19 and 0.96% w/w OP14.

EXAMPLE 7

The Effect of Antioxidant and UV Protectant Additives in the Stability of the Photochromic Material During Long Term Storage.

The 2% w/w OP19 solution in toluene with the additives AO-001 and LS-UV-001 (as described in Example 6 above) was prepared on Mar. 13, 2012 and stored at room temperature. The solution was tested for photochromic effect under UV laser on the date of preparation as well as on Apr. 10, 2012, approximately a month later. No change in the strength of the photochromic effect was observed.

The 0.96% w/w OP14 solution in toluene with the additives AO-001 and LS-UV-001 (as described in Example 6 above) was prepared on Mar. 4, 2012 and stored at room temperature. The solution was tested for photochromic effect under UV or violet laser on the date of preparation as well as on Apr. 10, 2012, approximately 5 weeks later. No change in the strength of the photochromic effect was observed.

EXAMPLE 8

Testing the Photochromic Effect of OP12 in Paraffin Oil at a Reduced Concentration of 0.05% OP12

The 0.15% w/w OP12 solution in paraffin oil (as described in Example 5 was further diluted by a factor of 3. 1.6 grams of light paraffin oil was added to 0.8 grams of the 0.15% w/w solution. The resulting paraffin oil-based solution contained OP12 at a concentration of 0.05% w/w and further contained toluene at a concentration of 1.3%. The diluted OP12 solution clearly exhibited the photochromic effect under UV or violet laser.

Remotely Marked Targets

Referring to FIG. 1A, showing a remote marking system 1, at least one marker unit 10 and at least one target region 20 are provided. The marker unit 10 may comprise at least one emitter 12 configured to emit at least one tracer signal 30. The target region 20 may comprise at least one receiving medium 22 comprising a photosensitive material configured to change its state upon reception of the tracer signal thereby recording the position at which the tracer signal 30 is received.

The emitter 10 may be configured to emit a tracer signal 30 comprising electromagnetic radiation such as visible light, infrared, ultraviolet and radio waves. Accordingly the emitter 10 may be a laser, LED, optical emitter or such like.

The receiving medium 22 may be a photosensitive material such as photochromic materials, photoluminescent materials, phosphorescent materials, thermochromic materials, polarising materials or the like. The material used for the receiving medium 22 may be selected to be appropriate for the context in which the remote marking unit 1 is used, as determined by a skilled practitioner. In addition, the material used for the receiving medium 22 is typically selected such that a detectable trace mark is left when the receiving medium is exposed to the tracer signal, as determined by a skilled practitioner. Further, the receiving medium 22 may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium 22.

With reference to FIG. 1B, an alternative target 120 is shown, which may include a matrix of photosensitive electronic component pixels 125 selected to react to exposure to the tracer signal. For example, the tracer signal may initiate a response from one or more of the photosensitive electronic component pixels, which may include photodiodes, photovoltaic cells, photodetectors, photomultipliers, photoconductors and the like.

Figure 1C:
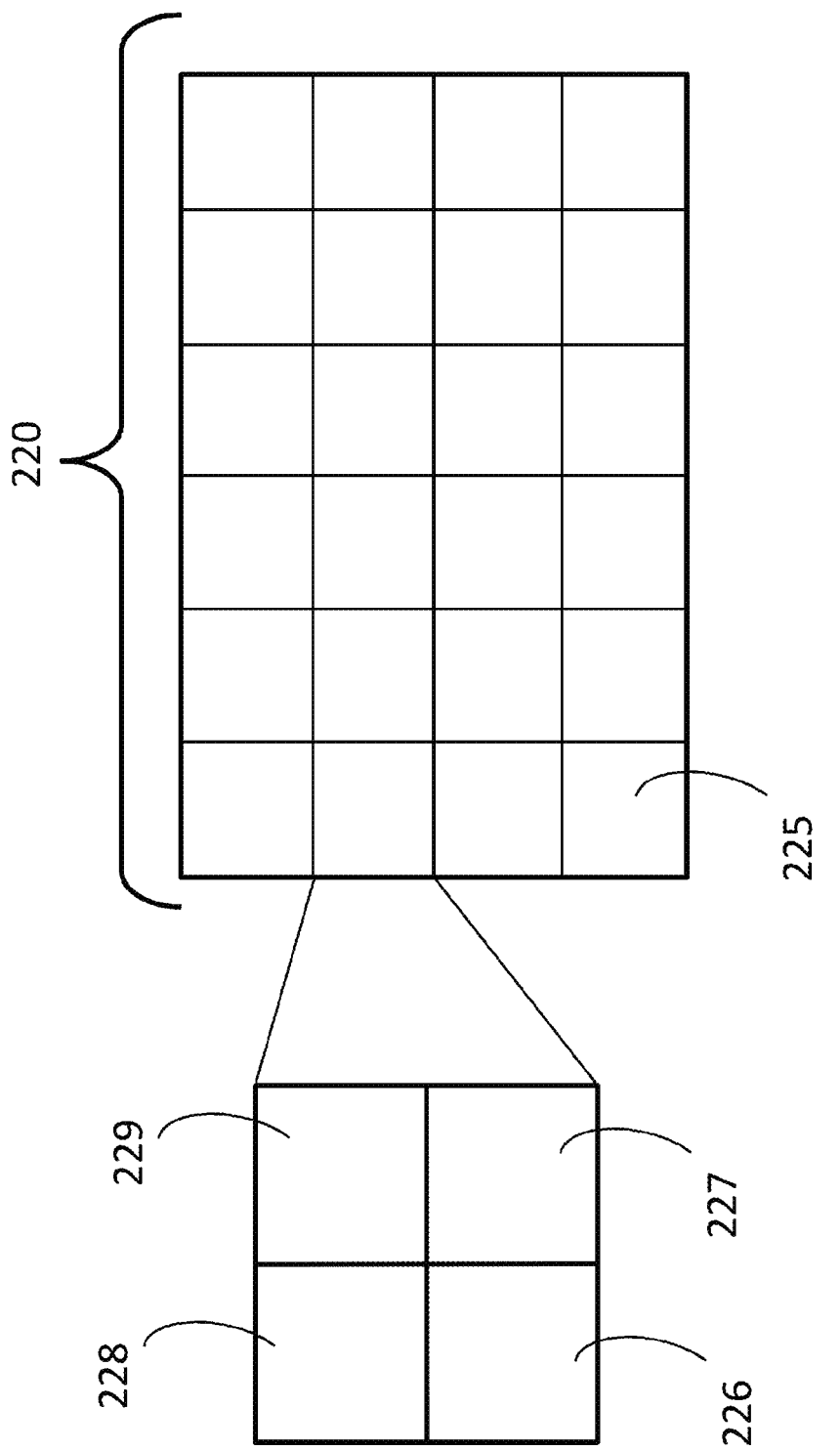
FIG. 1C shows a target comprising a matrix of pixels, each pixel comprising a plurality of sections, each section having a receiving medium, each receiving medium having individual characteristics.

With reference to FIG. 1C, an alternative target 220 is shown, which may comprise a matrix of pixels 225, with each pixel 225 comprising a plurality of sections (e.g., sections 226, 227, 228, 229), each section having a receiving medium, each receiving medium having individual characteristics. For example, a first receiving medium may be selected such that, upon reception of the tracer signal, a section of the target region changes its appearance in a first detectable manner. The first receiving medium may change color upon exposure to the tracer signal. As required, the color may change to: red, blue, green, black, grey, cyan, magenta, yellow, white or the like. The second receiving medium may be selected such that the target region changes its appearance in a second detectable manner different from that of the first receiving medium, perhaps to a different color.

Thus, for example, the target 225 may be a color target comprising an array of target regions 225, each target region comprising four sections, each section having one of four receiving media:

a first receiving medium 226 selected such that upon reception of the tracer signal, the color of at least a section of the target region turns red;
a second receiving medium 227 selected such that upon reception of the tracer signal, the color of at least a section of the target region turns green;
a third receiving medium 228 selected such that upon reception of the tracer signal, the color of at least a section of the target region turns blue; and
a fourth receiving medium 229 selected such that upon reception of the tracer signal, the color of at least a section of the target region turns black.

In one other example, a color target may include sections having one of four receiving media:

a first receiving medium selected such that upon reception of the tracer signal, the color of at least a section of the target region turns cyan;
a second receiving medium selected such that upon reception of the tracer signal, the color of at least a section of the target region turns magenta;
a third receiving medium selected such that upon reception of the tracer signal, the color of at least a section of the target region turns yellow; and
a fourth receiving medium selected such that upon reception of the tracer signal, the color of at least a section of the target region turns black.

The target region 225 may be a pixel.

The receiving medium may be a photosensitive material such as photochromic materials, photoluminescent materials, phosphorescent materials, thermochromic materials, polarising materials or the like. The material used for the receiving medium may be selected to be appropriate for the context in which the target 220 is used, as determined by a skilled practitioner. In addition, the material used for the receiving medium is typically selected such that a detectable trace mark is left when the receiving medium is exposed to the tracer signal, as determined by a skilled practitioner. Further, the receiving medium may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium.

According to a particular embodiment of the remote marking system, a device is provided for use in an exhibit, display or demonstration at, e.g., a science center. Interactive science centers often provide exhibits which require relatively complicated trajectories to be recorded. Examples include tracing the path of a pendulum, recording paths through a maze or the trajectory of a projectile. There are number of problems associated with existing ways of recording such trajectories in science centers. Recording apparatus using consumables such as pens or paper require replacing regularly and, particularly when used by untrained visitors, lead to waste, mess and high maintenance costs. In addition it is not easy to clear a previous path before tracing a new one. Moreover, pens and the like may be used to mark other surfaces and graffiti the walls of the science center for example.

Figure 2A:
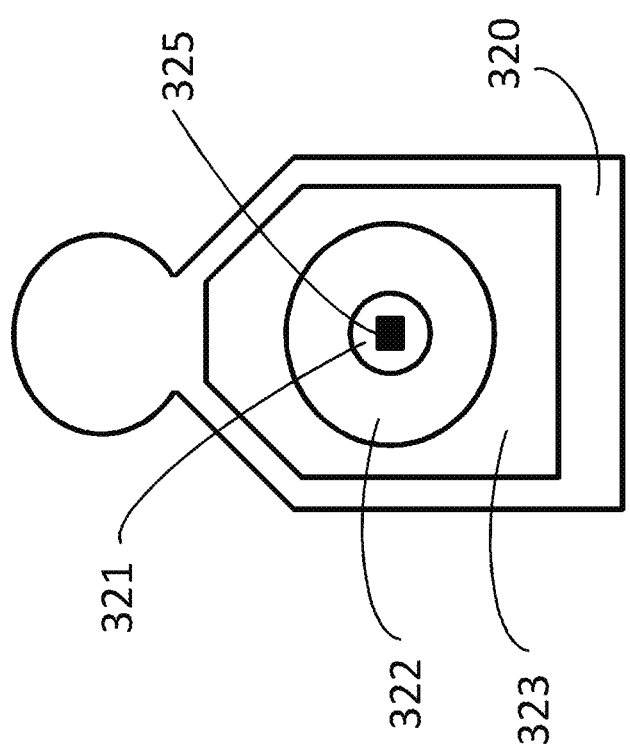
FIG. 2A shows a target with multiple target regions.

Referring now to FIG. 2A an example of a target 320 is shown. It is particularly noted that the target 320 may comprise a plurality of target regions (e.g., 321-323), which may each have a different receiving medium that turns a different color upon reception of the tracer signal. Optionally, electronic optical detectors 325 may be placed at defined locations within the target, for example, at a bulls-eye. Such a target may be used in combination with an emitter, for example in the shape of a gun (i.e., a gun-like emitter). The target regions may be configured on the target to indicate success or extent of failure to successfully aim the gun-like emitter at the defined locations on the target region, for example, the bulls-eye. Because the receiving medium may be a relatively cheap material, it is possible to cover large areas of the target, thus providing a background for an area surrounding the more costly electronic optical detector 325.

In another example, a photosensitive paint comprising the receiving medium may be used to provide a large photosensitive surface. According to a particular embodiment, the photosensitive paint may be used to create an extended photosensitive background for tracking the accuracy of shots from the gun-like emitter aimed at moving a target. The extended photosensitive background may thereby indicate the strike locations of stray shots.

The receiving medium may be a photosensitive material such as photochromic materials, photoluminescent materials, phosphorescent materials, thermochromic materials, polarising materials or the like. The material used for the receiving medium may be selected to be appropriate for the context in which the target 320 is used, as determined by a skilled practitioner. In addition, the material used for the receiving medium is typically selected such that a detectable trace mark is left when the receiving medium is exposed to the tracer signal, as determined by a skilled practitioner. Further, the receiving medium may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium.

Alternatively, a remote marking system may be incorporated into a toy, a writing apparatus, gaming device or the like.

Figure 2B:
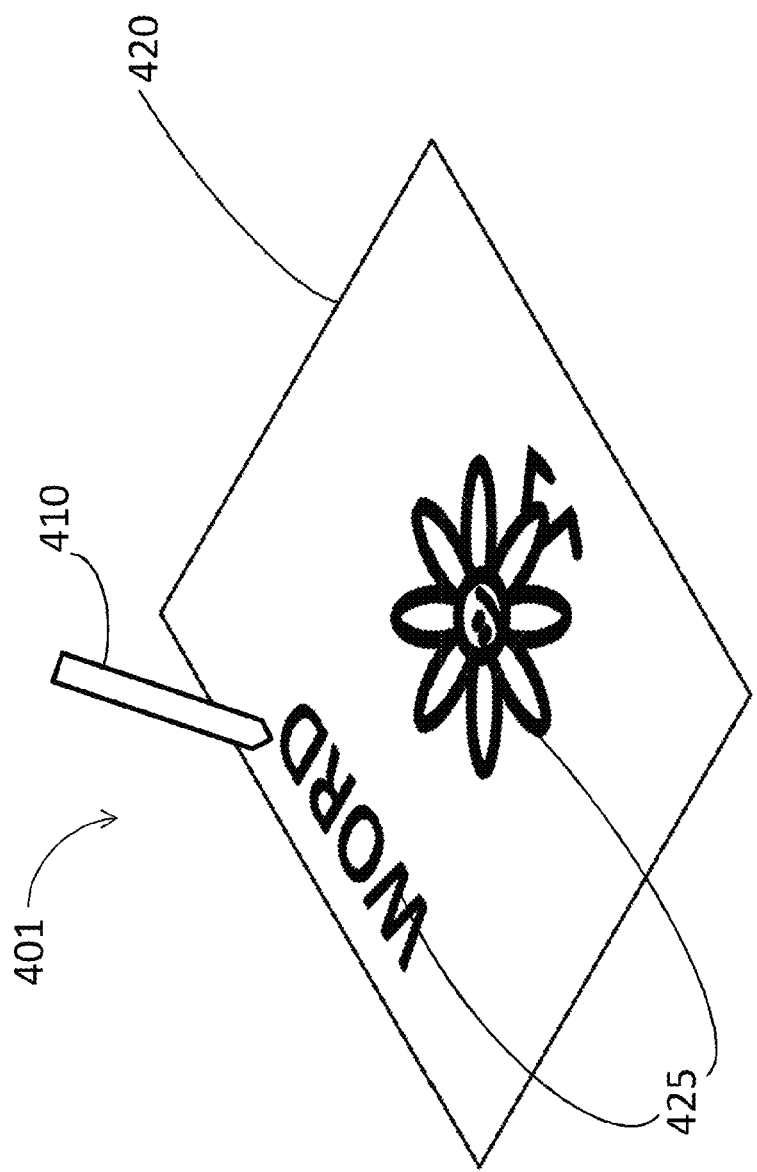
FIG. 2B shows a training apparatus for novice writers.

For example, referring now to FIG. 2B, a training apparatus 410 may be provided for novice writers or the like. The training apparatus may include at least one optical pen 410 and at least one training surface 420. The optical pen 410 may include an emitter (not shown) and the training surface 420 may include at least one receiving medium.

The receiving medium may be a photosensitive material such as photochromic materials, photoluminescent materials, phosphorescent materials, thermochromic materials, polarising materials or the like. The material used for the receiving medium may be selected to be appropriate for the context in which the training apparatus 410 is used, as determined by a skilled practitioner. In addition, the material used for the receiving medium is typically selected such that a detectable trace mark is left when the receiving medium is exposed to the tracer signal, as determined by a skilled practitioner. Further, the receiving medium may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium.

The training surface 420 may have patterns 425 printed thereupon, such as pictures, the shapes of letters, words and such like and a user may be encouraged to trace the printed pattern using the optical pen 410. The optical pen 410 may leave a record of the path traced by the user. In certain embodiments, the training surface 420 may include more than one receiving medium, such that a track of one color may indicate successful tracing whereas a track of a different color may indicate deviation from the correct path.

In another embodiment, optical writing may be provided by a dot matrix comprising an array of optical emitters, such as light emitting diodes or the like, configured to illuminate a receiving medium and to leave a mark thereupon.

Variously, the dot matrix may be a two dimensional array or a one dimensional array. The pixels of the array may be connected to a controller operable to illuminate selected emitters so as to display predetermined patterns. Optionally, a one dimensional array may be operable to trace a two dimensional pattern by a controller configured to select emitters accordingly to their position over a surface, perhaps using temporal control, such that a pattern is traced out by the pixels as the one dimensional array passes over the surface.

Alternatively or additionally, one or more emitters may be configured to emit intermittent tracer signals. The frequency, duration and duty cycles of such intermittent tracer signals may be selected to suit various requirements. For example, by scanning an intermittent emitter relative to a receiving medium, a pattern may be produced upon a target surface. Alternatively, a fixed frequency may be synchronized with motion for example produce a stroboscopic trace of periodic movement for example. Additionally, other tracer signals may be timed using various codes such as Morse code or the like to transfer data, perhaps secretly.

Furthermore, an emitter may be configured to emit pulses of known fixed duration. Accordingly, the rate of relative movement between the emitter and the target surface may be indicated by the length of trace left upon the target surface.

It is particularly noted that the tracer signal produces no friction and therefore should not affect mechanical forces acting on a system. Such a remote marking system may therefore be useful in frictionless velocity monitoring devices, for example in scientific equipment for measurement or demonstration, pendulum monitoring or the like.

A method is taught herein for tracing the trajectory of a remote marker. The method includes: obtaining a marker unit comprising at least one emitter; providing a target region comprising a receiving medium configured to change its state upon reception of the tracer signal; the marker unit emitting a tracer signal from a remote marker; and the target region recording the position at which the tracer signal is received.

Saftey

It is noted that where high intensity light is used to form the tracer signal or a remote marker system, the signal may be hazardous and may be harmful, particularly to the eyes. This may be a significant obstacle to the incorporation of such a remote marker system in public places such as science centers and the like.

Figure 3A:
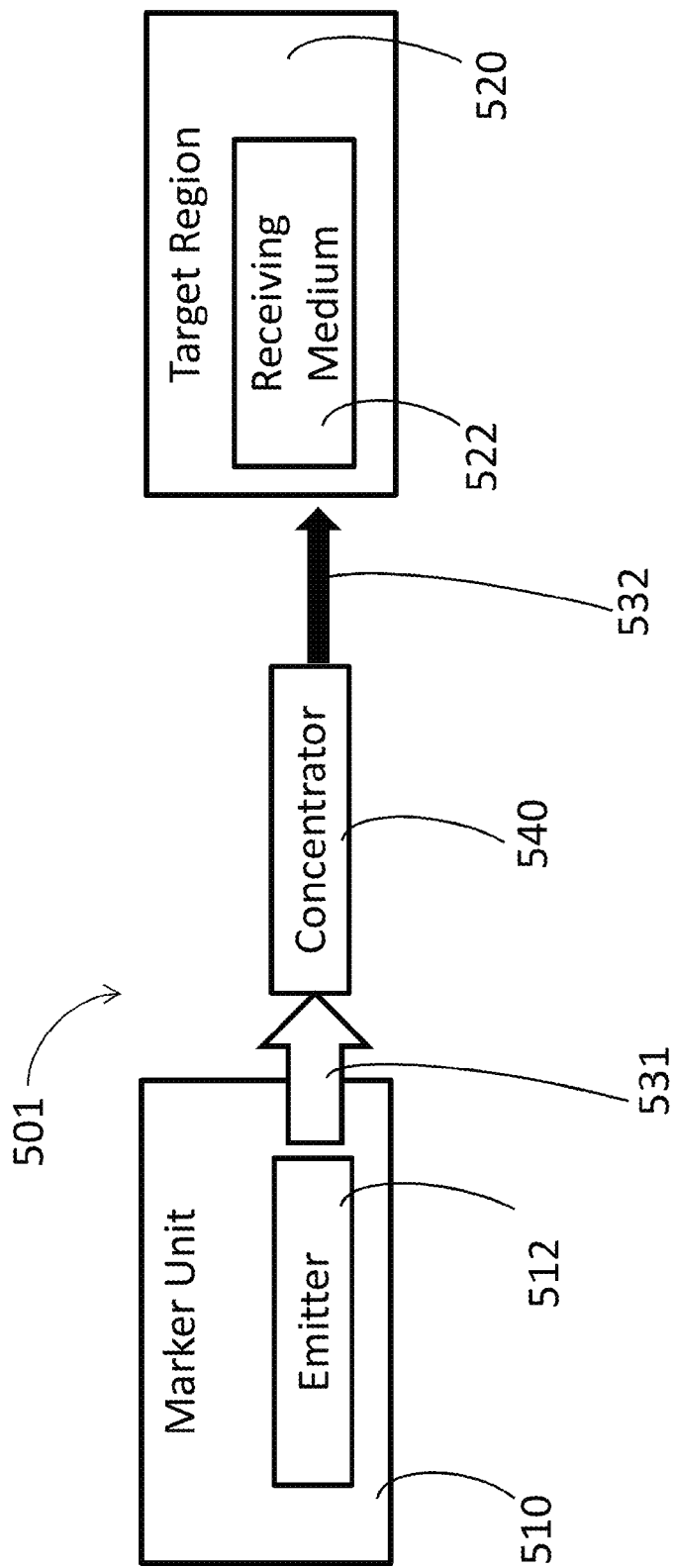
FIG. 3A shows a remote marking system comprising a marker unit, a concentrator and a target.

Reference is now made to the block diagram of FIG. 3A, representing selected elements of a remote marker system 501 which may be used to prevent high intensity tracer signals from causing a hazard.

The remote marking system 501 may include at least one marker unit 510, at least one target region 520 and at least one concentrator 540. The marker unit 510 comprises an emitter 512 configured to emit a low intensity tracer signal 531. The target region 520 comprises at least one receiving medium 522 configured to change its state upon reception of a high intensity tracer signal 532 thereby recording the position at which the high intensity tracer signal 532 is received. The concentrator 540 is configured to transform a low intensity tracer signal 531 to a high intensity tracer signal 532.

The concentrator 540 may be provided to ensure that the intensity of the tracer signal incident upon the target is sufficiently high that the receiving medium 522 responds in a detectable manner. It will be appreciated that the concentrator 540 may be of particular importance where a low intensity tracer signal 531 is emitted by the marker.

Optionally, the concentrator 540 may include a beam focusing device such as a converging lens, a concave reflector, an array of angled reflectors and the like.

The marker unit 510 may comprise an extended emitter 512 configured to emit a low intensity beam like tracer signal 531 over an extended region. Accordingly, the concentrator may be configured to focus the low intensity signal 531 such that the beam is incident upon a concentrated region of the receiving medium 522 with a greater intensity. Such an extended emitter 512 may comprise a high intensity emitter in combination with a beam disperser (not shown), such as a diverging lens, convex reflector, an array of angled reflectors and the like.

The receiving medium 522 may be a photosensitive material such as photochromic materials, photoluminescent materials, phosphorescent materials, thermochromic materials, polarising materials or the like. The material used for the receiving medium 522 may be selected to be appropriate for the context in which the remote marking system 501 is used, as determined by a skilled practitioner. In addition, the material used for the receiving medium 522 is typically selected such that a detectable trace mark is left when the receiving medium is exposed to the tracer signal, as determined by a skilled practitioner. Further, the receiving medium 522 may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium 522.

Figure 3B:
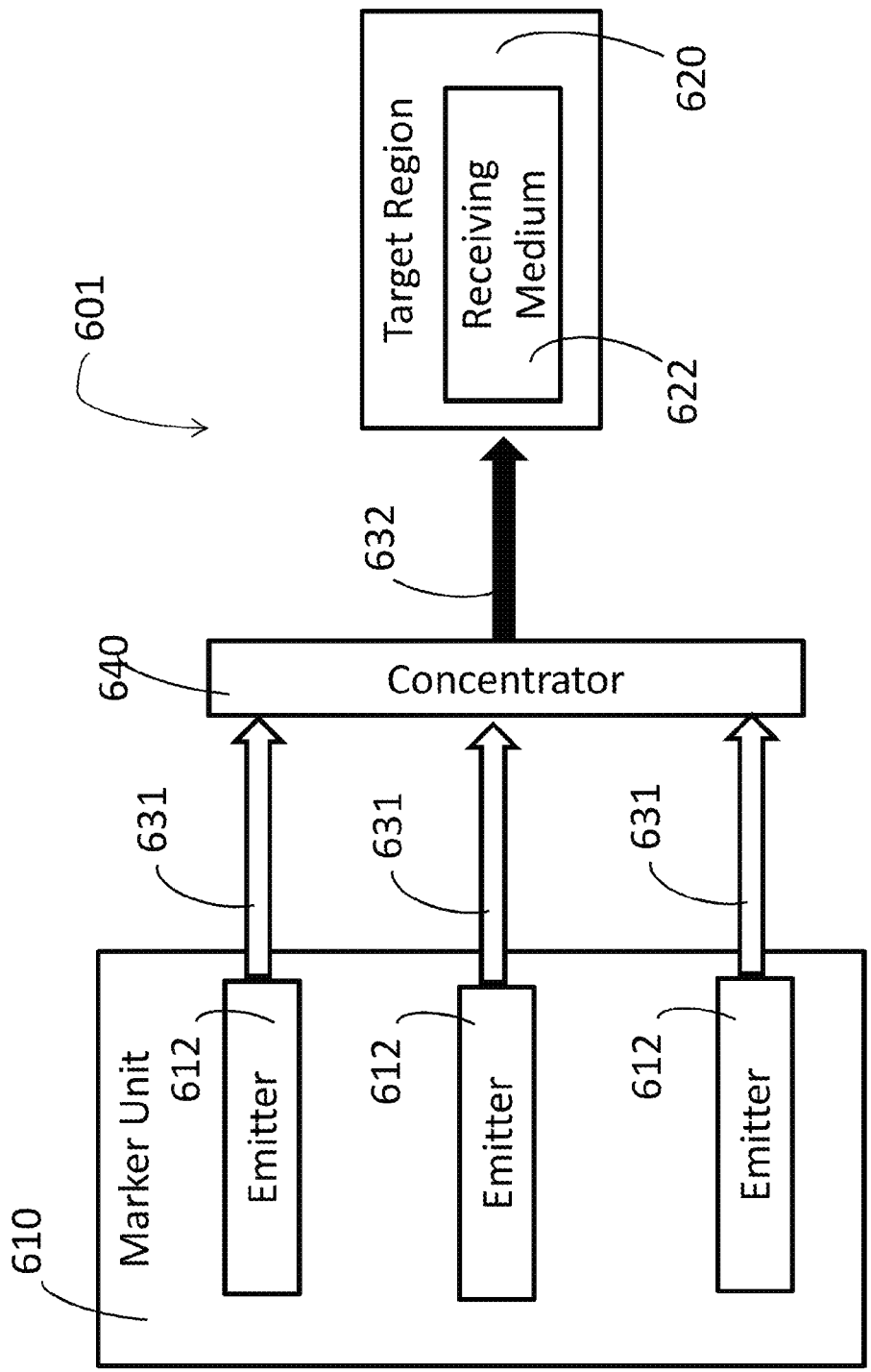
FIG. 3B shows a remote marking system comprising a marker unit with multiple emitters, a concentrator and a target.

Referring now to FIG. 3B showing the remote marking system 601, the marker unit 610 may comprise an array of low intensity emitters 612. Accordingly, the concentrator 640 may be arranged to angle the array of low intensity tracer signals 631 such that a high intensity tracer signal is directed towards a concentrated region of the receiving medium 622 on the target region 620. For example, the concentrator 640 may comprise an array of mirrors to direct the low intensity tracer signals 631 from a plurality of emitters 612 towards the target region 620.

The receiving medium 622 may be a photosensitive material such as photochromic materials, photoluminescent materials, phosphorescent materials, thermochromic materials, polarising materials or the like. The material used for the receiving medium 622 may be selected to be appropriate for the context in which the remote marking system 601 is used, as determined by a skilled practitioner. In addition, the material used for the receiving medium 622 is typically selected such that a detectable trace mark is left when the receiving medium is exposed to the tracer signal, as determined by a skilled practitioner. Further, the receiving medium 622 may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium 622.

It is particularly noted that, for safety purposes, it may be necessary to limit the intensity of the tracer signal to below a safe limit. Accordingly, a safe threshold may be determined and the emitters may be configured to emit the tracer signal at an intensity lower than that threshold.

In still other systems, a pulsed tracer signal may be produced intermittently for short duration and aimed at a particular target region, such that the additive effect of multiple pulses produces a detectable response in a receiving medium. This may be particularly useful for example with lasers which may produce beams of fixed minimum intensity.

Visual Display Unit

According to other remote marking systems, a target region may be extended into three dimensions to provide a three dimensional display unit.

Figure 4A:
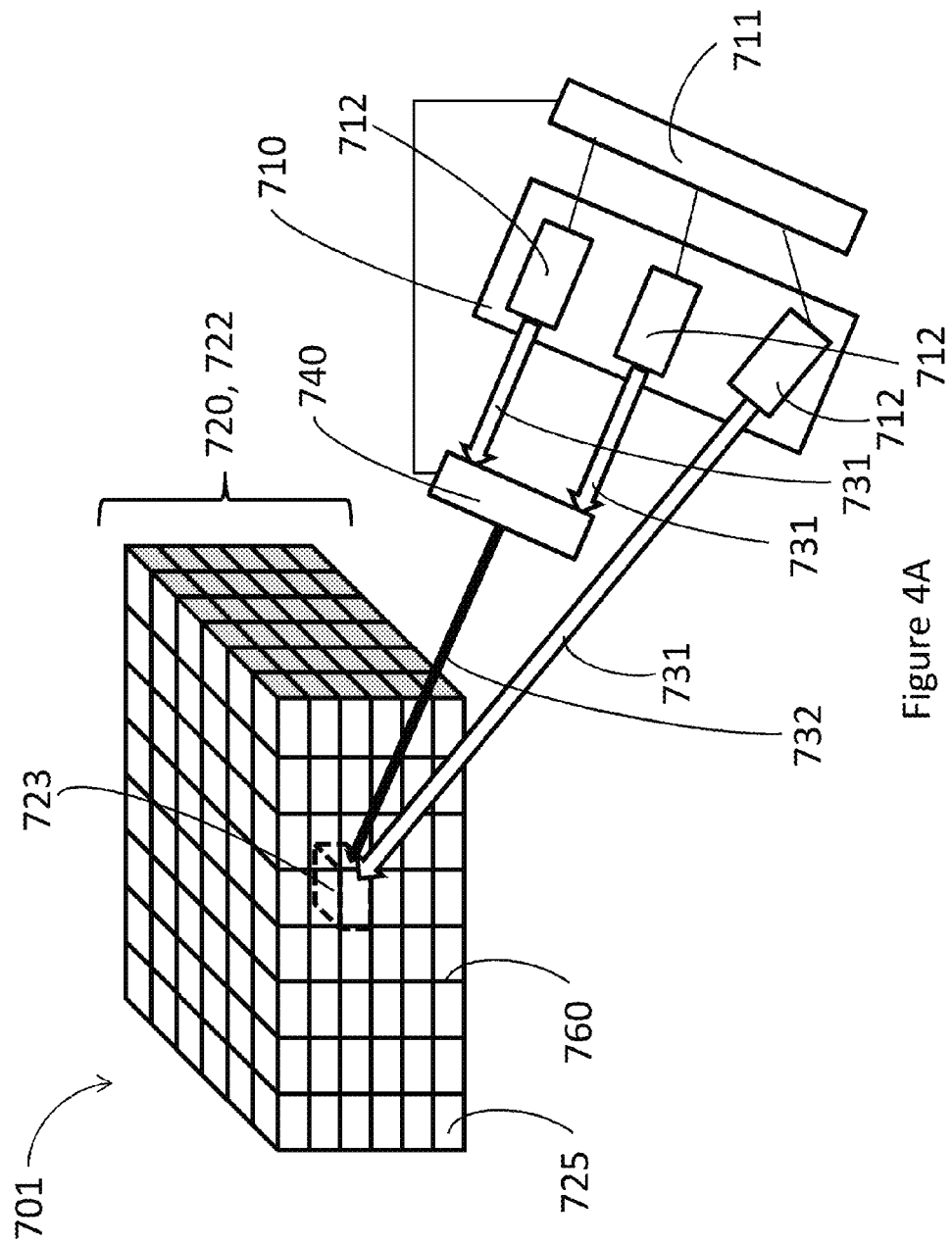
FIG. 4A shows a three dimensional display device.
Figure 4B:
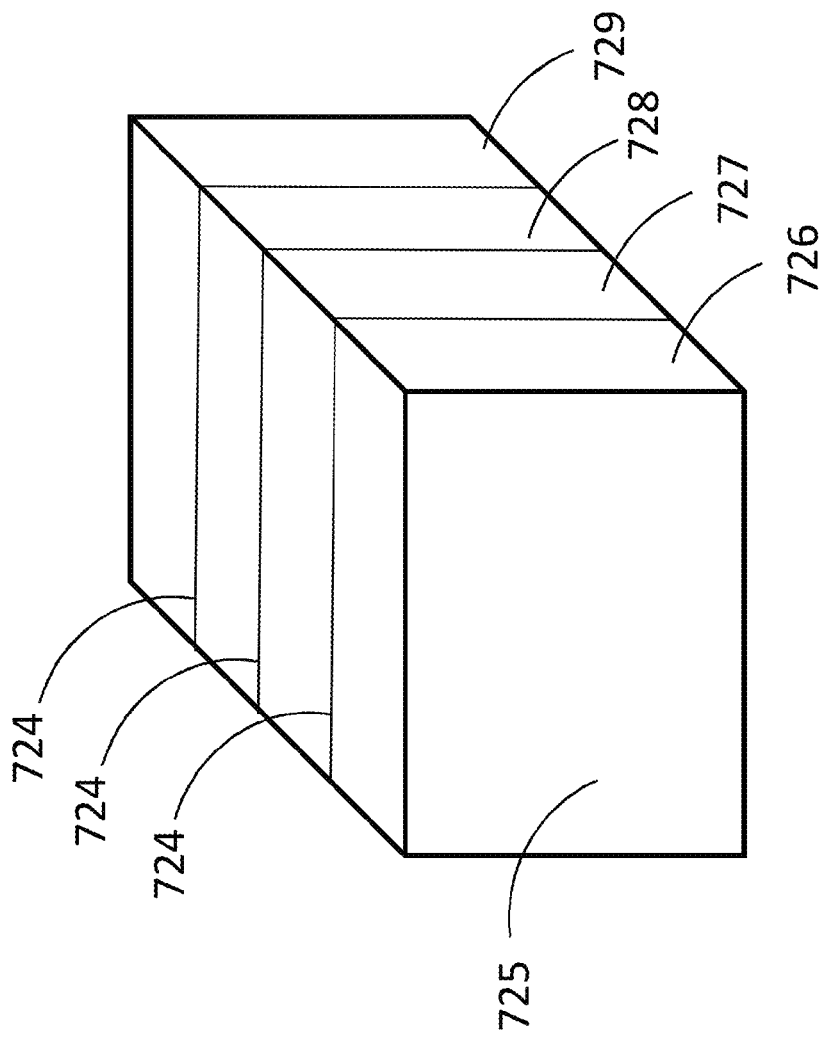
FIG. 4B shows a voxel of a three dimensional display device.

Referring to FIG. 4A, a three dimensional display device 701 is shown including a marker unit 710, a concentrator 740 and an extended target region 720. The marker unit 710 comprises at least one emitter 712 configured to emit at least one low intensity tracer signal 731. The extended target region 720 comprises at least one receiving medium 722 configured to change its state upon reception of a tracer signal at an intensity above a given threshold thereby recording the position at which the high intensity tracer signal 732 is received. The concentrator 740 is configured to focus a low intensity tracer signal 731 such that at least a section of the target region is exposed to a high intensity tracer signal 732.

Optionally, the concentrator 740 may include a beam focusing device such as a converging lens, a concave reflector, an array of angled reflectors and the like. Alternatively, multiple emitters 712 capable of emitting low intensity tracer signals 731 may be provided which may be directed towards a common target 723 such that the intensity of the tracer signal at the common target 723 exceeds the given threshold and the receiving medium 722 detectably changes state.

The extended target region 720 may be divided into an array of pixels or voxels 725. Accordingly, the concentrator 740 may direct the high intensity tracer signal 732 to individual pixels or voxels 725.

It will be appreciated that in most three dimensional arrangements, many voxels 725 are internal and bordered on all sides by other voxels 725. In order that such internal voxels are observable, the receiving medium 722 and inter-voxel partitions 760 may be translucent or transparent to visible light. Furthermore, the receiving medium 722 and inter-voxel partitions 760 may be translucent or transparent to the tracer signal 731, 732.

A controller/scanning apparatus 711 and the like may be configured and operable to control the emitters 712 and the concentrator 740 and thereby to select particular voxels. Accordingly, the emitter 712 may be operable to trace an image within the target region 720. Where required a three dimensional image may be constructed therewithin.

Furthermore, algorithms may be used to prevent earlier targeted voxels interfering with the targeting of subsequent voxels. For example, a controller 711 may be configured to target the furthest or deepest voxels first and then to target voxels progressively closer to the surface of the target region.

Generally, the target region 720 may comprise at least a first receiving medium selected such that upon reception of the tracer signal, at least a section of the target region changes its appearance in a detectable manner upon reception of the tracer signal.

Optionally, the target region comprises multiple receiving media selected such that upon reception of the tracer signal, at least a section of the target region changes its appearance in other distinct detectable manner. Accordingly, receiving media may be selected such that upon reception of the tracer signal, the color of at least a section of the target region changes to a color selected from a group consisting of red, blue, green, black, grey, cyan, magenta, yellow, white or the like and combinations thereof.

Referring now to FIG. 3B, a single voxel is represented of a possible visual display. The voxel 725 may comprise four separate chambers divided by intravoxel partitions 724. Each chamber contains a separate receiving medium (726-729). Optionally, a first receiving medium 726 is selected such that, upon reception of the tracer signal, the color of at least a section of the voxel turns red; a second receiving medium 727 is selected such that, upon reception of the tracer signal, the color of at least a section of the voxel turns green; a third receiving medium 728 is selected such that, upon reception of the tracer signal, the color of at least a section of the voxel turns blue; and a fourth receiving medium 729 is selected such that, upon reception of the tracer signal, the color of at least a section of the voxel turns black. Alternatively, a first receiving medium 726 is selected such that, upon reception of the tracer signal, the color of at least a section of the voxel turns cyan; a second receiving medium 727 is selected such that, upon reception of the tracer signal, the color of at least a section of the voxel turns magenta; a third receiving medium 728 is selected such that, upon reception of the tracer signal, the color of at least a section of the voxel turns yellow; and a fourth receiving medium 729 is selected such that, upon reception of the tracer signal, the color of at least a section of the voxel turns black.

The receiving medium may be a photosensitive material such as photochromic materials, photoluminescent materials, phosphorescent materials, thermochromic materials, polarising materials or the like. The material used for the receiving medium may be selected to be appropriate for the context in which the three dimensional display device 701 is used, as determined by a skilled practitioner. In addition, the material used for the receiving medium is typically selected such that a detectable trace mark is left when the receiving medium is exposed to the tracer signal, as determined by a skilled practitioner. Further, the receiving medium may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium.

Where required, receiving media with short half-lives may be provided such that the image may be updated at high frequency to provide a rapidly changing three dimensional display. It is noted that, in combination with an emitter connected to a suitable controller and scanning mechanism, a three dimensional moving image may be generated.

Accordingly, a method is taught for producing three dimensional images comprising: obtaining a marker unit comprising at least one emitter configured to emit at least one tracer signal; obtaining a target region extended into three dimensions comprising at least one receiving medium configured to change its state upon reception of a tracer signal; and the marker emitting tracer signals such that they are incident upon sections of the target region, the sections of the target region being selected such that the state of the receiving medium within the sections is detectably altered.

Flow Monitor

Efficient fluid flow through piping systems is important in the delivery and distribution of many fluids on many scales. Monitoring of fluid flow through such systems may be helpful in designing fluid systems such as water distribution systems, hydraulic systems, oil distribution systems and fuel lines to ensure that piping is sufficient. Water systems, for example, often suffer from fluid hammer when a pressure wave changes direction suddenly and may produce high stresses upon sections of a pipeline. Fluid hammer may cause pipes to burst or otherwise become damaged or weakened.

Furthermore, monitoring of fluid flow is central to the efficient hydrodynamic and aerodynamic design of various devices such as propellers, pumps, watercraft, aircraft and the like.

Known flow monitors typically inject a small quantity of a tracer fluid into the fluid to be monitored. However, the injection of tracer fluid represents an intrusion into the system. Such an intrusion may result in turbulence or the like which may interfere with the natural flow of the fluid.

Alternatively flow monitors such as the kalliroscope may use rheoscopic fluids to make visible the direction of flow within a system. Rheoscopic fluids are suspensions of ellipsoidal platelets which may align their larger dimensions with the shear planes of flowing liquid. However, particles within suspensions such as rheoscopic fluids tend to settle over time. Furthermore, measurement of flow rates using kalliroscopes are notoriously inaccurate.

Figure 5A:
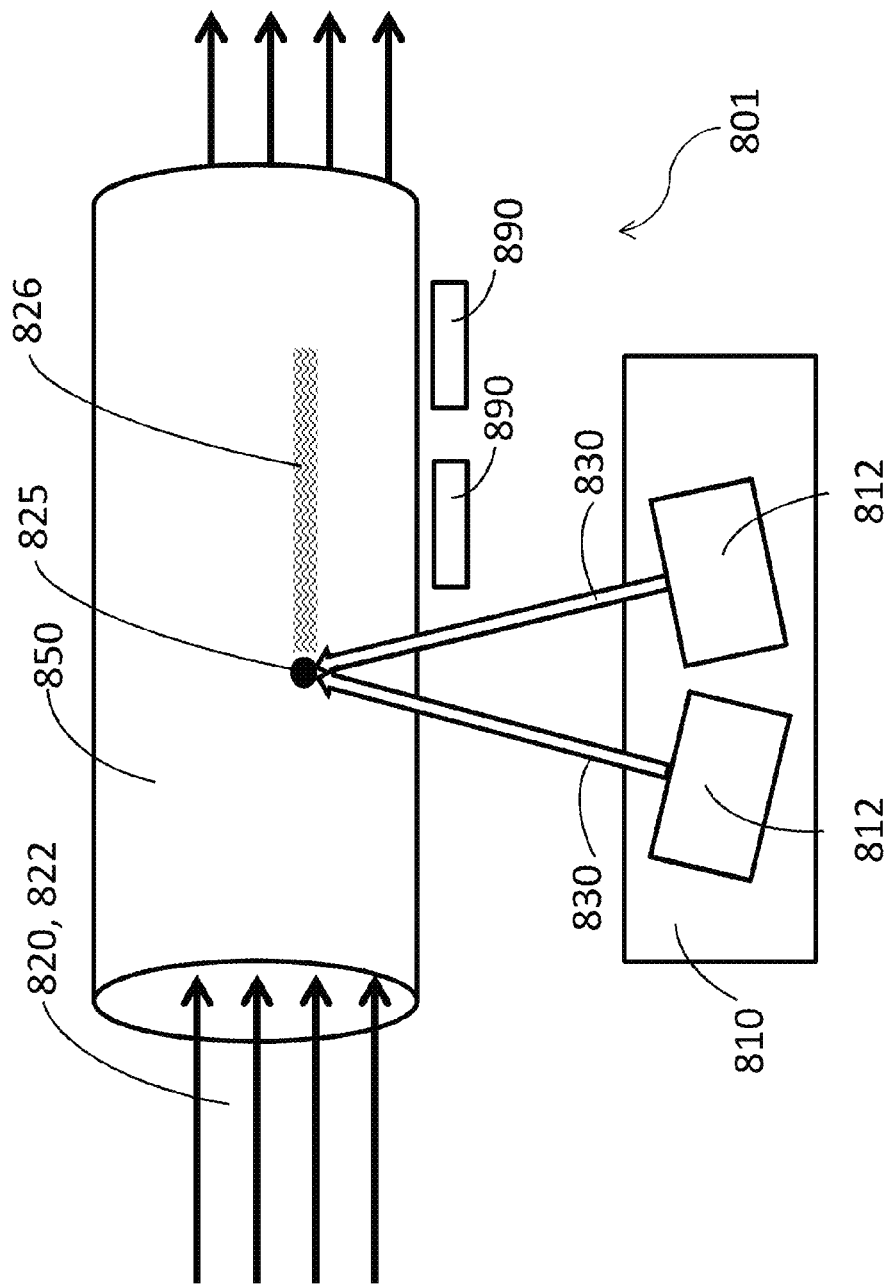
FIG. 5A shows a flow monitor.

It is particularly noted that remote markers such as described herein may be incorporated into devices for monitoring fluid flow in a non-intrusive manner. Reference is now made to FIG. 5A showing a flow monitor 801, where a tracer fluid 820 is free to flow through a section of piping 850. A tracer signal 830 is directed towards a position 825 in the tracer fluid 820 such that the spot changes its state in a detectable manner.

The subsequent path of the detectable spot 826 may be tracked using detectors 870, cameras or other suitable tracking devices. Accordingly, the flow monitor 801 may comprise at least one marker unit 810 comprising at least one emitter 812 configured to emit at least one tracer signal 831 towards a flowing tracer fluid 820, possibly a flowing liquid or gas. The tracer fluid 820 comprises at least one receiving medium 822 configured to change its state upon reception of a high intensity tracer signal or a convergence of multiple low intensity tracer signals thereby recording the position 825 at which the tracer signals are received.

Optionally, the flow monitor may further comprise detectors 890 operable to detect changes in the receiving medium 822 of the tracer fluid 820. Such detectors may include single sensors, multiple sensors, still cameras, video cameras, stroboscopic cameras or the like. It is noted that where required the sampling rate of a detector may be synchronized with the emission rate of the marker unit.

It is noted that the flow monitor 801 may be used to monitor the flow of a fluid, possibly through a piping system, or alternatively the diffusion, dispersion or circulation of fluid.

Figure 5B:
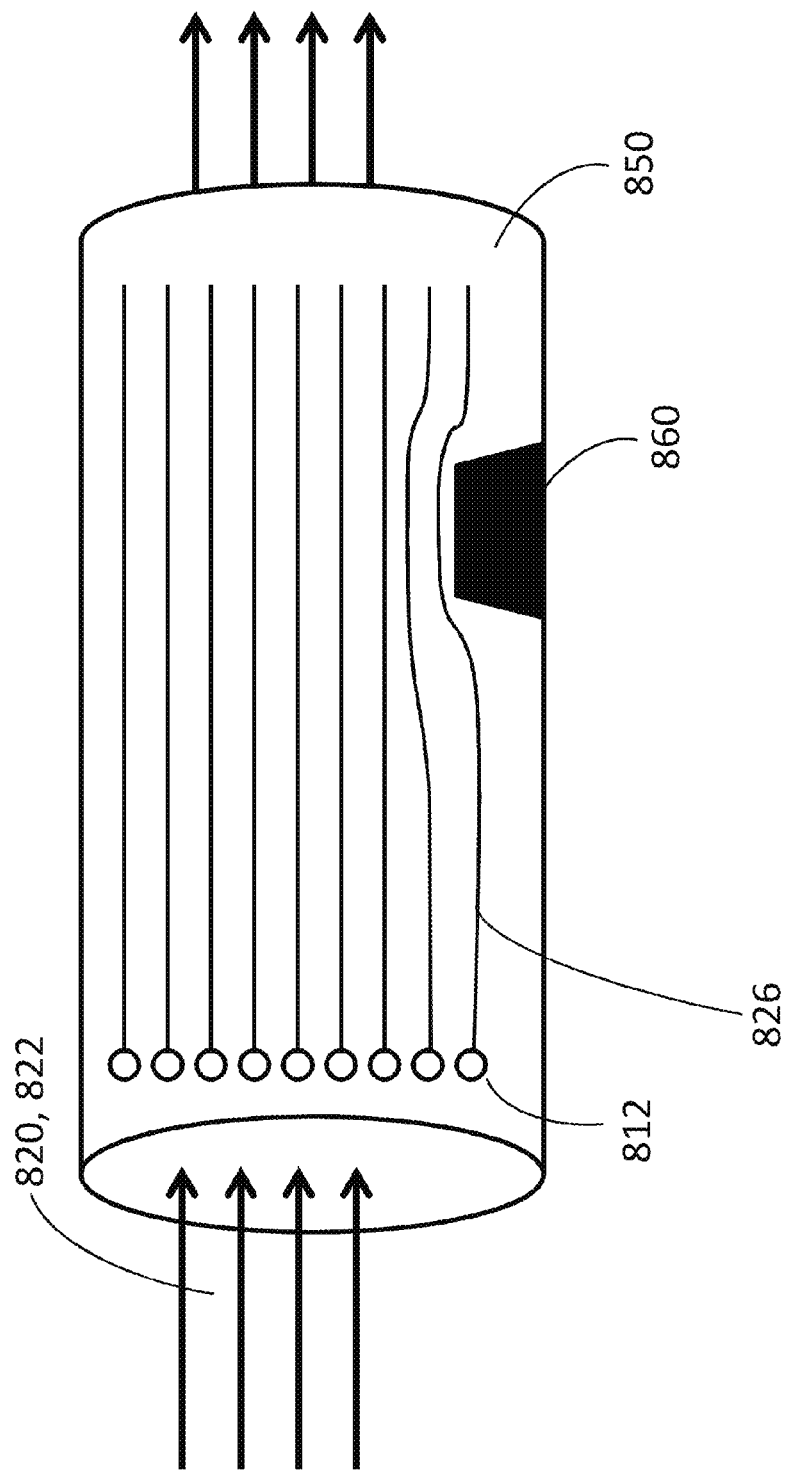
FIG. 5B shows an alternative flow monitor.

It is noted that the marker unit 810 may be external to the fluid flow and configured to aim a tracer signal 830 thereinto. See, e.g., FIG. 5A. Alternatively or additionally, marker units 810 may be situated inside the fluid flow 820 itself. For example, an array of emitters 812 (e.g., LED emitters) may be provided across the width of a pipe to allow the profile of fluid flow visualized at the subsequent paths of the detectable spots 826 to be detected. See, .e.g, FIG. 5B.

Where required, the duration or duty cycle of the maker unit may be selected to suit requirements. For example, the length of a portion of tracer fluid that has been transformed into a detectable state by an emitted tracer signal of fixed duration pulse may allow the rate of fluid flow to be measured directly. See, e.g., FIG. 5B that shows an array of emitters 812 used to demonstrate the profile of fluid flow past an obstruction 860.

The receiving medium 822 may be a photosensitive material such as photochromic materials, photoluminescent materials, phosphorescent materials, thermochromic materials, polarising materials or the like. The material used for the receiving medium 822 may be selected to be appropriate for the context in which the flow monitor 801 is used, as determined by a skilled practitioner. In addition, the material used for the receiving medium 822 is typically selected such that a detectable trace mark is left when the receiving medium is exposed to the tracer signal, as determined by a skilled practitioner. Further, the receiving medium may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium 822.

A method is taught for monitoring fluid flow comprising: providing at least one marker unit configured to emit at least one tracer signal; providing at least one tracer fluid comprising a receiving medium; at least one marker unit emitting a tracer signal towards the tracer fluid; detecting changes in the tracer fluid indicating material exposed to the tracer signal; and tracking the progress of the exposed material along the fluid flow.

Electronic Signature Capture

Electronic signature capture devices are devices, which may capture and save signatures, for example, in order to electronically sign documents. For example, customer signature verification may be provided for a point of sale transaction or the like.

Electronic signature capture devices typically comprise a touch sensitive pad and a stylus. The touch sensitive pad may be operable to record the track of the stylus over the pad. Thus when the stylus is used to write a signature, the signature may be recorded, perhaps digitally.

Although the signature may be stored without any visible trace being left on the pad, a signer may prefer to see their own signature. Feedback may be provided, for example using a touch sensitive screen configured to display the signature back to the signer in real time. However, it will be appreciated that this may add considerably to the complexity and cost of such a device.

It is noted that photosensitive markers, such as described herein, may be further incorporated into a virtual writing system to provide a useful feedback mechanism for the signer.

Figure 6A:
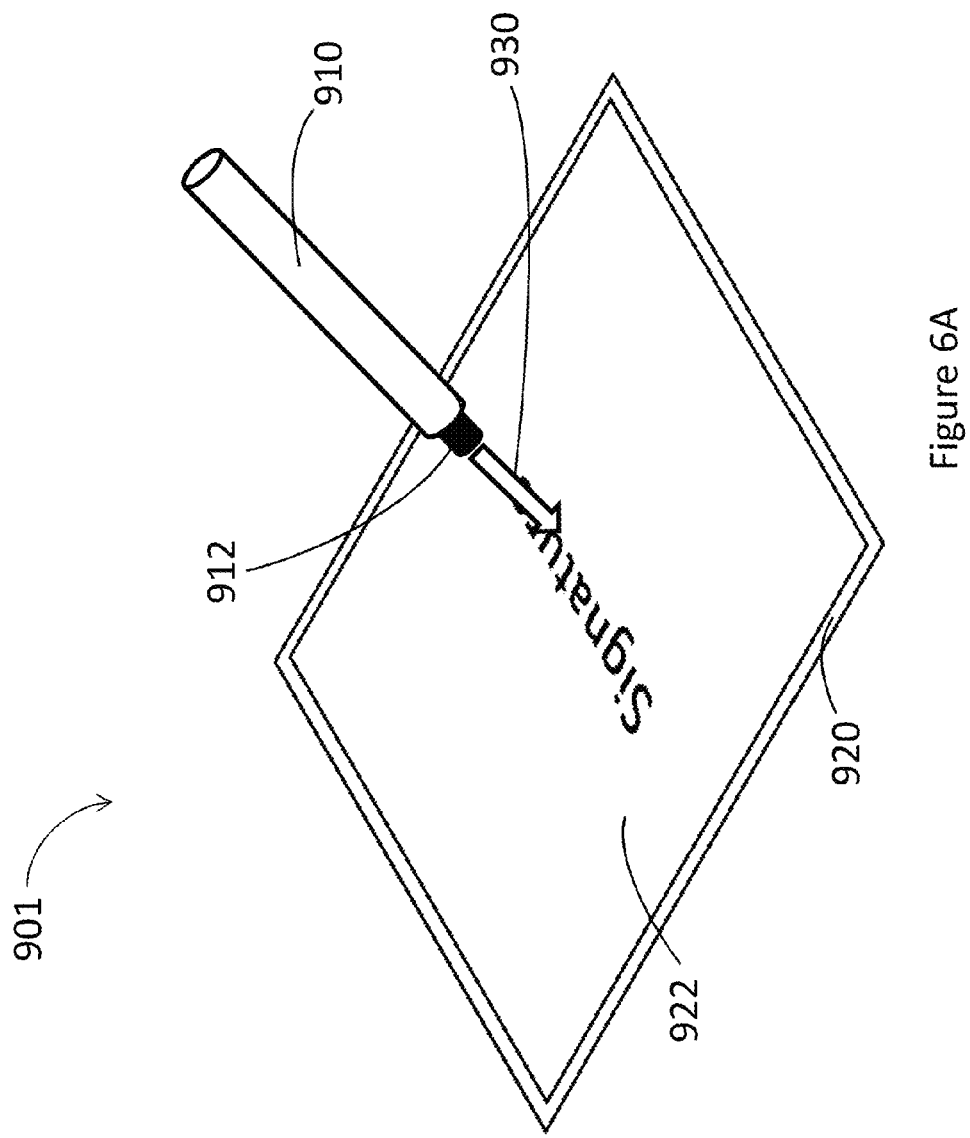
FIG. 6A shows an electronic signature capture device.

Referring to FIG. 6A, a virtual writing system 901 is disclosed comprising: a stylus 910 and a touch pad 920 configured to record the track of the stylus. The touch pad 920 comprises a touch sensitive surface (not shown) coated with at least one receiving medium 922 configured to change its optical state upon reception of a tracer signal 930. The stylus 910 comprises an emitter 912 configured to emit a tracer signal 930 such that a visible track is left upon the touch pad 920.

The receiving medium 922 may be a photosensitive material such as photochromic materials, photoluminescent materials, phosphorescent materials, thermochromic materials, polarising materials or the like. The material used for the receiving medium 922 may be selected to be appropriate for the context in which the virtual writing system 901 is used, as determined by a skilled practitioner. In addition, the material used for the receiving medium 922 is typically selected such that a detectable trace mark is left when the receiving medium is exposed to the tracer signal, as determined by a skilled practitioner. Further, the receiving medium 922 may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium 922.

Figure 6B:
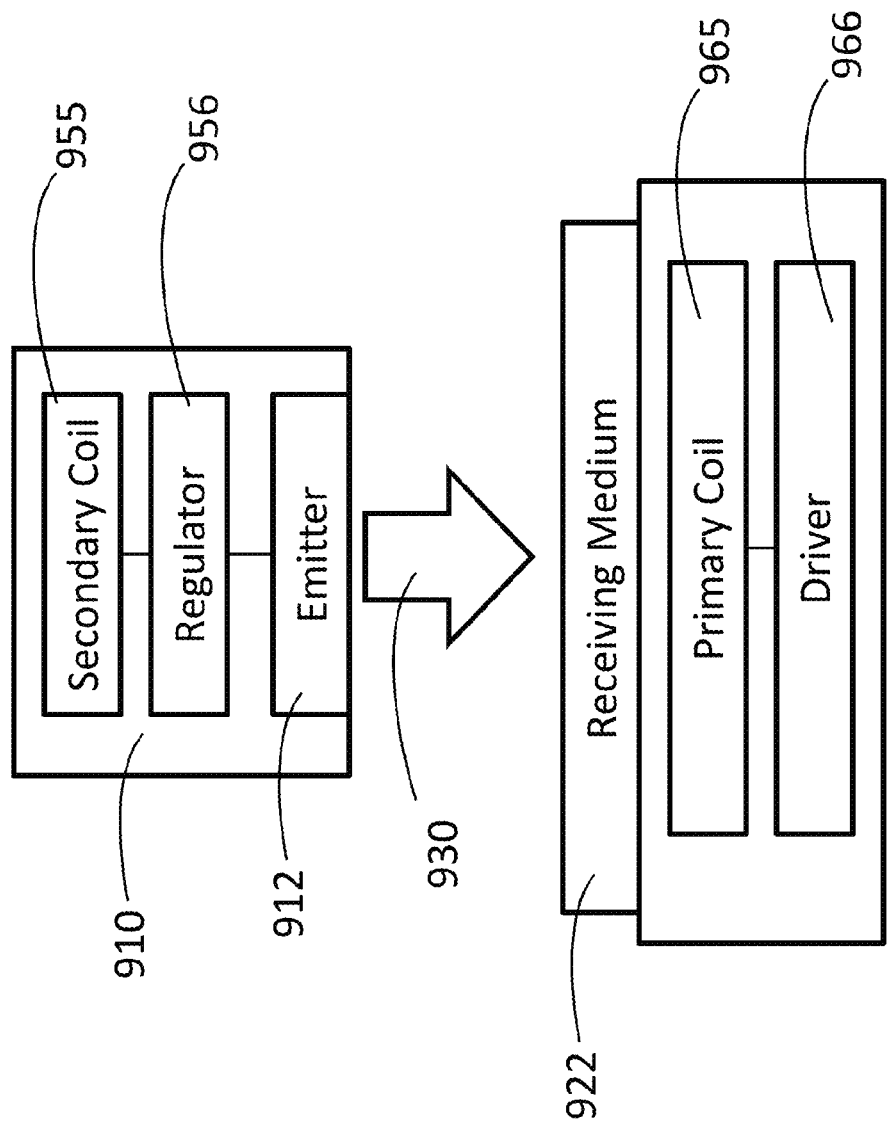
FIG. 6B shows an electronic signature capture device with an inductive power couple.

Referring now to the block diagram of FIG. 6B, according to some embodiments, the virtual writing system 901 may further include an inductive power transfer system for transferring power to the stylus cordlessly. The inductive power transfer system may include an inductive power receiver 950 incorporated into the stylus 910 which is operable to receive power from an inductive power transmitter 960 perhaps incorporated into the touch pad 920. Such an inductive power transmitter 960 may be incorporated into the touch pad 920 such that the stylus 910 emits a tracer signal 930 when in proximity thereto.

The inductive power transmitter 960 may include a primary inductor 965 connected to a power source (not shown) via a driver 966. The driver 966 may be operable to supply an oscillating potential across the primary inductor 965 thereby creating an oscillating magnetic field in its vicinity. The inductive power receiver 950 may include a secondary inductor 955 wired to the emitter 912. When the secondary inductor 955 is placed in the oscillating magnetic field, an oscillating potential is induced thereacross which may be used to supply power to the emitter. Where required a power regulator 956 may be provided, for example, to provide current rectification in the receiving unit where required.

The emitter 912 may be configured to emit a tracer 930 signal of electromagnetic radiation such as visible light, infrared, ultraviolet, microwaves or radio waves or combinations thereof.

Methods are taught for capturing an electronic signature comprising: obtaining a touch pad coated with a receiving medium; obtaining an emitter.

Harmonograph

FIG. 7A shows a harmonograph 1001 incorporating another embodiment of the remote marker. The harmonograph 1001 may be operable to trace geometrical drawings, such as ellipses, spirals, figure eights, other Lissajous figures or the like upon a surface.

The harmonograph 1001 may include a pendulum 1100 and a base unit 1200. The pendulum 1100 may comprise a pivoting apparatus 1150, a bob 1170 and a connecting rod 1160 therebetween. At least one emitter 1112 may be incorporated into the bob 1170 of the pendulum 1100 and directed towards the base 1220. At least one receiving medium 1222 may be provided in the base selected such that it may change its appearance detectably upon reception of a tracer signal (not shown).

The receiving medium 1222 may be a photosensitive material such as photochromic materials, photoluminescent materials, phosphorescent materials, thermochromic materials, polarising materials or the like. The material used for the receiving medium 1222 may be selected to be appropriate for the context in which the harmonograph 1001 is used, as determined by a skilled practitioner. In addition, the material used for the receiving medium 1222 is typically selected such that a detectable trace mark is left when the receiving medium is exposed to the tracer signal, as determined by a skilled practitioner. Further, the receiving medium 1222 may be selected with a half-life suitable to allow the tracing apparatus to self-erase over a desired time period for repeated use. Alternatively the photosensitive material may change have multiple stable states and may be reset as required after each use. See the section "RECEIVING MEDIUM" for further discussion on the receiving medium 1222.

Accordingly, a two dimensional projection of the motion of the pendulum bob may be recorded upon the base 1220. The motion of the pendulum bob 1170 will typically depend upon various parameters including the nature of the pivoting apparatus 1150. It is particularly noted that a pivoting apparatus 1150 may include multiple axes at different distances from the bob 1170.

Figure 7B:
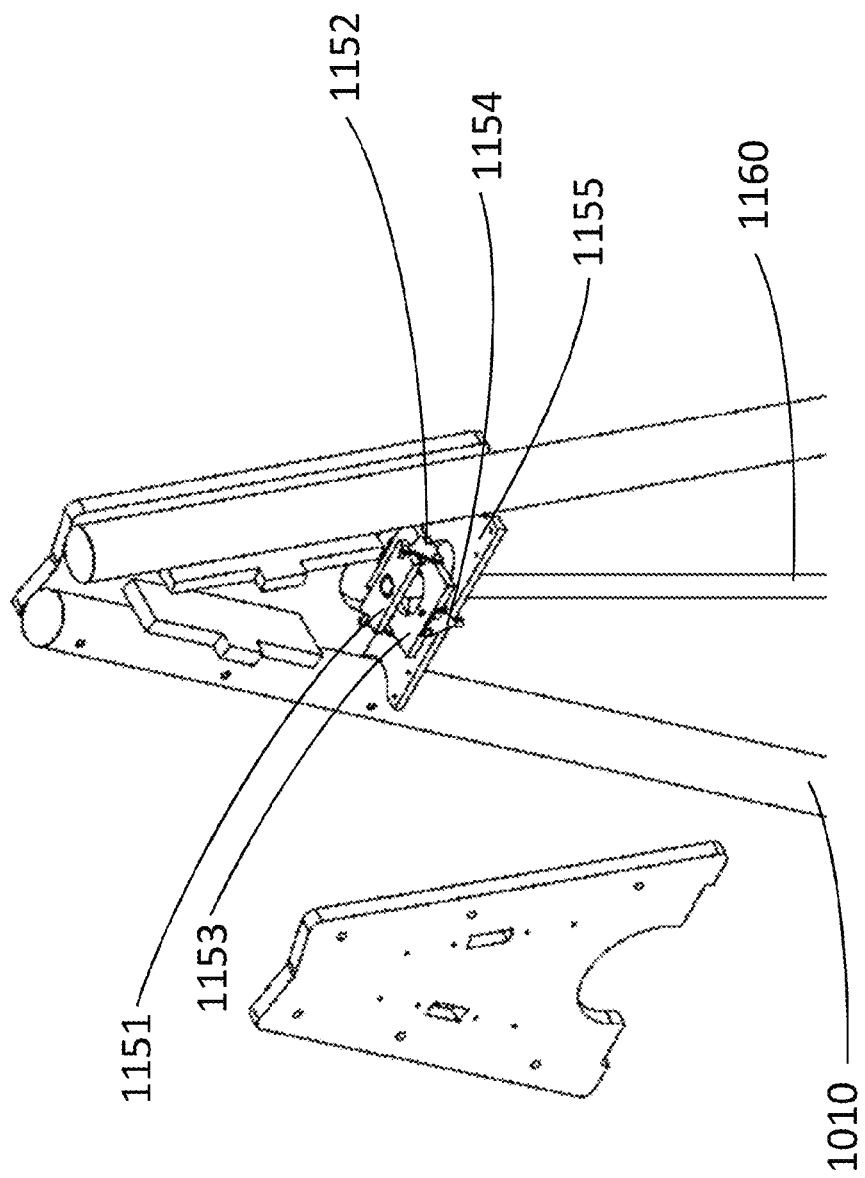
FIG. 7B shows a harmonograph.

Referring to FIG. 7B, for the purposes of illustration only, in one particular embodiment of the pivoting apparatus, the connecting rod is coupled to a first oscillation plate 1151, which is configured to pivot about a first fulcrum 1152 mounted to a second oscillation plate 1153, which itself configured to pivot about a second fulcrum 1154 mounted to a support 1055. The pivoting axis of each oscillation plate may be independent. It is further noted that the frequency of oscillation associated with each of the oscillation plates 1151, 1153 are typically different. Where required, an adjustment mechanism may be provided by which the distance between the first oscillation plate 1151 and the second oscillation plate 1153 may be changed to tune the oscillation frequency to suit requirements.

In some embodiments, the base unit 1200 may include a primary inductor (not shown) connected to a power source (not shown) via a driver (not shown). The driver (not shown) may be operable to supply an oscillating potential across the primary inductor (not shown) thereby creating an oscillating magnetic field in its vicinity. Accordingly, the bob 1170 may include a secondary inductor (not shown) wired to the emitter 1112. When the secondary inductor (not shown) is placed in the oscillating magnetic field, an oscillating potential is induced thereacross which may be used to supply power to the emitter (1112). Where required, a power regulator may be provided (not shown), for example, to provide current rectification in the receiving unit (not shown).

Optionally, the electrical supply to the emitter 1112 may be controlled by a switch (not shown), thereby allowing a user to select when the tracer signal is emitted and when not. Alternatively, the duration and timing of the tracer signal may be determined automatically, perhaps being synchronized with extremities of motion or the like.

Still other embodiments will occur to the man of the art. Further, it will be understood by one of ordinary skill in the art the systems, methods and compositions described herein may be adapted and modified as is appropriate for the application being addressed and that the systems, methods and compositions described herein may be employed in other suitable applications, and that such other additions and modifications will not depart from the scope hereof.

What is claimed is:

1. A remote marking system comprising:
   at least one marker unit;
   at least one target region; and
   at least one concentrator,
   wherein said marker unit comprises at least one emitter configured to emit at least one low intensity tracer signal,
   wherein said target region comprises at least one receiving medium configured to change its state upon reception of a high intensity tracer signal thereby recording the position at which said high intensity tracer signal is received,
   wherein said concentrator is configured to transform a low intensity tracer signal to a high intensity tracer signal, and
   wherein said marker unit comprises an extended emitter operable to emit a low intensity tracer signal over an extended region and said concentrator is configured to focus said low intensity signal such that it is incident upon a concentrated region of said receiving medium.

2. The system of claim 1 wherein said concentrator comprises a beam focusing device selected from a group consisting of: a converging lens, a concave reflector, an array of angled reflectors and combinations thereof.

3. The system of claim 1 wherein said extended emitter comprises a high intensity emitter and a beam disperser selected from a group consisting of: a diverging lens, convex reflector, an array of angled reflectors and combinations thereof.

4. The system of claim 1 wherein said extended emitter comprises an array of low intensity emitters.

5. The system of claim 4 wherein said concentrator comprises said array of low intensity emitters being angled towards the concentrated region of said receiving medium.

6. The system of claim 1 wherein said emitter is configured to emit a tracer signal at an intensity lower than a first threshold.

7. The system of claim 1 wherein said receiving medium is configured to record the position of a tracer signal received above a second threshold.

8. The system of claim 1 wherein at least one said receiving medium comprises a photosensitive material selected from the group consisting of:
   photochromic materials, photoluminescent materials, phosphorescent materials, thermochromic materials and polarising materials.

9. The system of claim 1 wherein at least one said receiving medium comprises a photosensitive material selected from the group consisting of:
   a matrix of photosensitive electronic components selected from the group consisting of:
   photodiodes, photovoltaic cells, photodetectors, photomultipliers and photoconductors.

10. The system of claim 1 comprising at least a first target region comprising a first receiving medium and a second target region comprising a second receiving medium wherein, upon reception of said tracer signal, said first receiving medium changes its appearance in a first detectable manner and said second receiving medium changes its appearance in a second detectable manner.

11. The system of claim 1 incorporated into a device selected from the group consisting of:
   a device for providing a demonstration in a science center, a visual display unit, a harmonograph, a toy, a flow monitor and a writing apparatus.

12. A remote marking system comprising:
   at least one marker unit;
   a plurality of target regions; and
   at least one concentrator,
   wherein said marker unit comprises at least one emitter configured to emit at least one low intensity tracer signal,
   wherein said target region comprises at least one receiving medium configured to change its state upon reception of a high intensity tracer signal thereby recording the position at which said high intensity tracer signal is received, and
   wherein said concentrator is configured to transform a low intensity tracer signal to a high intensity tracer signal, and
   each said target region comprises:
   a first receiving medium selected such that upon reception of said tracer signal, the color of at least a section of said target region turns red;

a second receiving medium selected such that upon reception of said tracer signal, the color of at least a section of said target region turns green;

a third receiving medium selected such that upon reception of said tracer signal, the color of at least a section of said target region turns blue;

and a fourth receiving medium selected such that upon reception of said tracer signal, the color of at least a section of said target region turns black.

13. The system of claim 12 wherein said plurality of target regions is arranged into an array.

14. A remote marking system comprising:
   at least one marker unit;
   at least one target region; and
   at least one concentrator,
   wherein said marker unit comprises at least one emitter configured to emit at least one low intensity tracer signal,
   wherein said target region comprises at least one receiving medium configured to change its state upon reception of a high intensity tracer signal thereby recording the position at which said high intensity tracer signal is received, and
   wherein said concentrator is configured to transform a low intensity tracer signal to a high intensity tracer signal, and
   further comprising a concentrator configured to increase the intensity of the tracer signal, wherein said concentrator comprises a beam focusing device selected from a group consisting of: a converging lens, a concave reflector, an array of angled reflectors and combinations thereof.

* * * * *